United States Patent
Rivas et al.

(10) Patent No.: US 10,387,206 B2
(45) Date of Patent: Aug. 20, 2019

(54) SYSTEMS AND METHODS FOR MANAGING HELP REQUESTS

(71) Applicants: Maybelline Rivas, Torrance, CA (US); Kevin Fernandez, Torrance, CA (US)

(72) Inventors: Maybelline Rivas, Torrance, CA (US); Kevin Fernandez, Torrance, CA (US)

( * ) Notice: Subject to any disclaimer, the term of this patent is extended or adjusted under 35 U.S.C. 154(b) by 0 days.

(21) Appl. No.: 15/801,088

(22) Filed: Nov. 1, 2017

(65) Prior Publication Data

US 2018/0121244 A1 May 3, 2018

Related U.S. Application Data

(60) Provisional application No. 62/416,543, filed on Nov. 2, 2016.

(51) Int. Cl.

| | |
|---|---|
| *G06F 9/50* | (2006.01) |
| *G06Q 10/06* | (2012.01) |
| *G06Q 30/02* | (2012.01) |
| *G06Q 10/10* | (2012.01) |
| *G06F 16/958* | (2019.01) |
| *H04M 7/00* | (2006.01) |

(52) U.S. Cl.
CPC ........... *G06F 9/5027* (2013.01); *G06Q 10/06* (2013.01); *G06Q 30/02* (2013.01); *H04M 7/0045* (2013.01); *G06F 16/958* (2019.01); *G06Q 10/10* (2013.01); *H04M 2242/04* (2013.01); *H04M 2242/15* (2013.01)

(58) Field of Classification Search
CPC .............................. G06F 9/5027; G06Q 10/06
USPC .................................................. 718/102–108
See application file for complete search history.

(56) References Cited

U.S. PATENT DOCUMENTS

| | | | |
|---|---|---|---|
| 8,112,495 B2 | 2/2012 | Hazlewood et al. | |
| 8,380,655 B2 | 2/2013 | Nevin et al. | |
| 8,611,935 B2 * | 12/2013 | Duarte ................... | G06Q 50/01 455/466 |

(Continued)

OTHER PUBLICATIONS

Shirali-Shahreza, Mohammad. "Emergency SMS." SICE-ICASE, 2006. International Joint Conference. IEEE, 2006.pp. 1139-1142 (Year: 2006).*

(Continued)

*Primary Examiner* — Satish Rampuria
(74) *Attorney, Agent, or Firm* — Maier & Maier, PLLC

(57) ABSTRACT

According to an exemplary embodiment, a computer implemented system and method of help request management may be shown and described. The system may include a server having at least one non-transitory computer-readable medium storing executable instructions and a processor adapted to execute the instructions; at least one database communicatively coupled to the server for storing data; at least one requestor access device in communication with the server via a network; and at least one helper access device in communication with the server via the network; wherein the server is configured to: receive help requests from the at least one requestor access device; store the help request data in a database; identify one or more access devices associated with at least one helper; transmit the help request data to the one or more identified access devices associated with the at least one helper; and display the help request data to the at least one helper.

12 Claims, 31 Drawing Sheets

(56) References Cited

U.S. PATENT DOCUMENTS

| | | | |
|---|---|---|---|
| 8,726,284 B2 | 5/2014 | Liao et al. | |
| 8,782,637 B2* | 7/2014 | Khalid | G06F 8/61 |
| | | | 718/1 |
| 9,055,067 B1* | 6/2015 | Ward, Jr. | H04L 67/10 |
| 9,870,629 B2* | 1/2018 | Cardno | G06Q 10/10 |
| 2005/0086290 A1 | 4/2005 | Joyce et al. | |
| 2005/0124318 A1* | 6/2005 | Jeon | G08B 25/016 |
| | | | 455/411 |
| 2009/0274145 A1* | 11/2009 | Laliberte | H04M 7/006 |
| | | | 370/352 |
| 2010/0235886 A1* | 9/2010 | Muller | G06Q 30/02 |
| | | | 726/4 |

OTHER PUBLICATIONS

Thompson, Chris, et al. "Using smartphones to detect car accidents and provide situational awareness to emergency responders." International Conference on Mobile Wireless Middleware, Operating Systems, and Applications. Springer, Berlin, Heidelberg, 2010. pp. 29-42 (Year: 2010).*

Kwan, Mei-Po, and Jiyeong Lee. "Emergency response after 9/11: the potential of real-time 3D GIS for quick emergency response in micro-spatial environments." Computers, Environment and Urban Systems 29.2 (2005): pp. 93-113. (Year: 2005).*

* cited by examiner

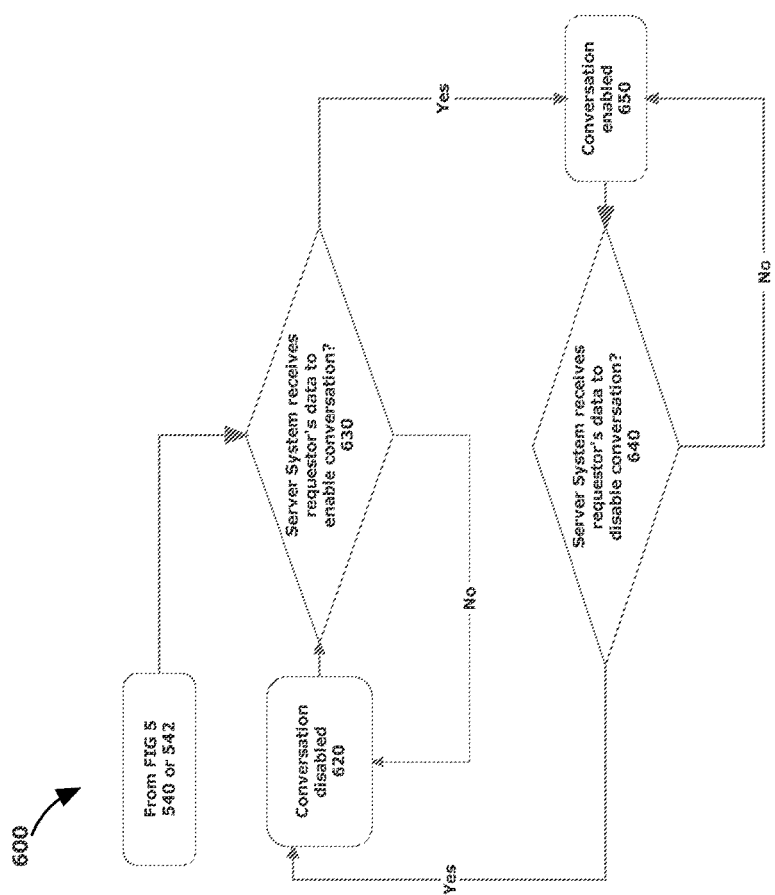

SYSTEMS AND METHODS FOR MANAGING HELP REQUESTS

CROSS REFERENCE TO RELATED APPLICATIONS

This application claims priority to U.S. Provisional Application No. 62/416,543, filed Nov. 2, 2016, the contents of which is herein incorporated by reference.

BACKGROUND

Virtual employment networks facilitate assistance searching opportunities for online applicants. These networks have created opportunities for freelance assistance, expanding the market and contributing to the service sector growth. With an increasingly growing freelance industry, there is a need to efficiently manage local demand with freelance support.

SUMMARY OF THE INVENTION

Exemplary embodiments described herein may relate generally to help request management, and more specifically to a computer implemented system and method for locally-sourced assistance.

According to an exemplary embodiment, a computer implemented method of task request management may be shown and described herein. The method may include receiving, from a requestor via an access device, a help request; the help request comprising data related to the identification of the requestor and a geographical location of the access device; storing, by at least one processor, the help request data in a database; identifying, by the at least one processor, one or more access devices associated with at least one helper; transmitting, by the at least one processor, the help request data to the one or more identified access devices associated with the at least one helper; and displaying, via an interface of the one or more identified access devices, the help request data. The method may further include receiving, from the one or more access devices associated with the at least one helper, a response to the help request, the response indicating whether the at least one helper has offered to help with the help request; storing, by the at least the processor, the response data in the database; transmitting, by the at least one processor, only the response data indicating an offer to help with the help request to the requestor access device; and displaying, via an interface of the requestor access device, the transmitted response data.

In some exemplary embodiments, the requestor may be prompted to enable communication between the requestor access device and that of the at least one helper associated with the transmitted data upon receiving transmitted response data. If enabled, a communication portal may be established between the requestor access device and that of the least one helper associated with the transmitted data to facilitate a hosted conversation. The invention may also provide means to disable a computing device hosted conversation, preventing users from receiving any further communications regarding that computing device hosted conversation in the future.

According to another exemplary embodiment, a system for the management of help requests may be shown and described herein. The system may include a server having at least one non-transitory computer-readable medium storing executable instructions and a processor adapted to execute the instructions; at least one database communicatively coupled to the server for storing data; at least one requestor computing device in communication with the server via a network; and at least one helper computing device in communication with the server via the network; wherein the server is configured to: receive help requests from a requestor access device, store the help request data in a database; identify one or more access devices associated with at least one helper; transmit the help request data to the one or more identified access devices associated with the at least one helper; and display the help request data to the at least one helper.

BRIEF DESCRIPTION OF THE DRAWINGS

Advantages of embodiments of the present invention will be apparent from the following detailed description of the exemplary embodiments. The following detailed description should be considered in conjunction with the accompanying figures in which:

FIG. 4-0*b*-4-5*b* is a flow chart illustrating an example of the method when used to manage one computing device hosted help request and related computing device hosted conversations.

FIG. 5 is a flow chart illustrating an example of the method when used to manage a computing device hosted help request's states based on the user actions implemented via an access device, sent to the server system and associated to said help request.

FIGS. 6-0 and 6-1 is a flow chart illustrating an example of the method when used to manage a computing device hosted conversation's states based on the user actions implemented via an access device, sent to the server system and associated to said computing device hosted conversation.

DETAILED DESCRIPTION OF THE INVENTION

Figure 1:
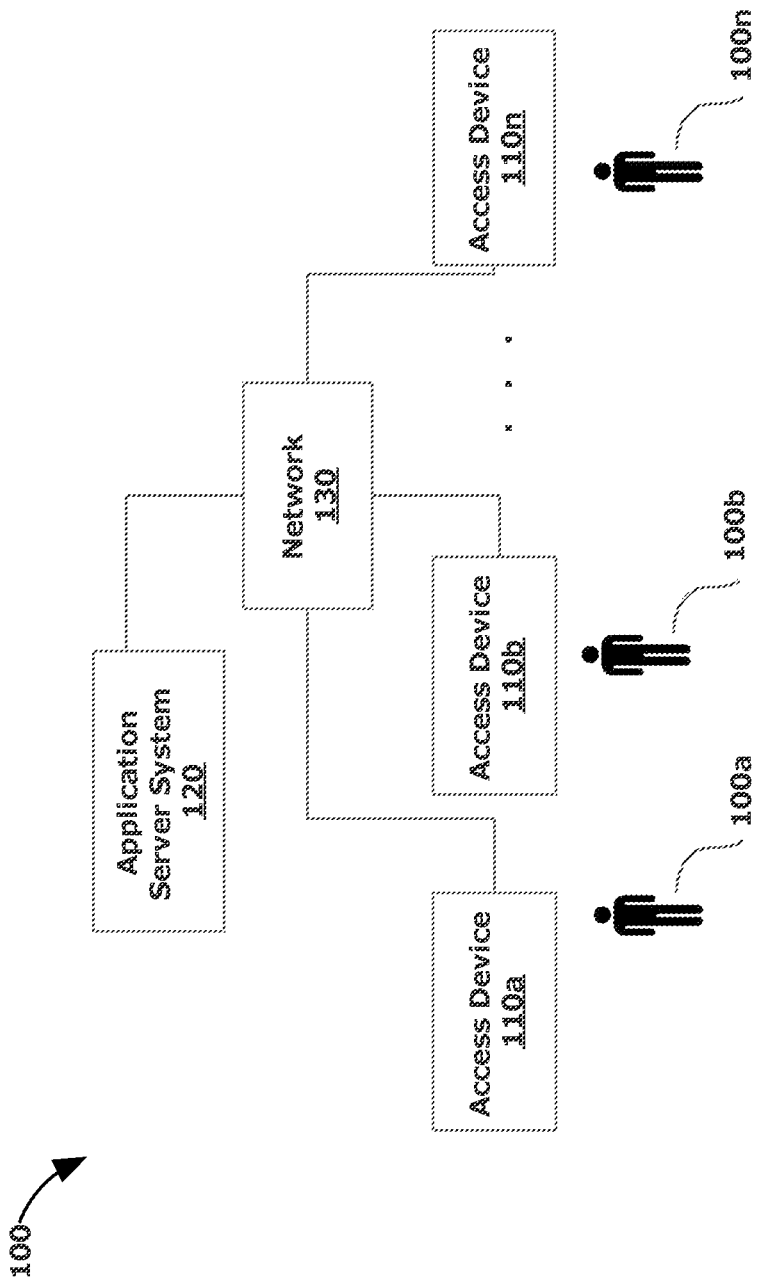
FIG. 1 is a block diagram illustrating an example of the system used to implement the method to manage one or more computing device hosted requests.

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many of the embodiments described herein are described in terms of sequences of actions to be performed by, for example, elements of a computing device. It should be recognized by those skilled in the art that the various sequence of actions described herein can be performed by specific circuits (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in a number of different forms, all of which have been contemplated to be within the scope of the claimed subject matter. In addition, for each of the embodiments described herein, the corresponding form of any such embodiments may be described herein as, for example, "a computer configured to" perform the described action.

In some embodiments, the numbers expressing quantities, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be noted that any language directed to a computer should be read to include any suitable combination of computing devices, including servers, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network. Computer software that is "programmed" with instructions is developed, compiled, and saved to a computer-readable non-transitory medium specifically to accomplish the tasks and functions set forth by the disclosure when executed by a computer processor.

Exemplary embodiments of the present disclosure may provide a system and method for computer-implemented help request management.

As used herein, the term "data" may refer generally, though not necessarily, to any information or units of information representing qualitative or quantitative variables on which operations can be performed by a computer, being stored and transmitted in the form of electrical signals and recorded on magnetic, optical, or mechanical recording media. The term "metadata" may refer generally, though not necessarily, to a set of data that describes and/or provides information about other data.

The term "authorization" as used herein, may refer generally, though not necessarily, to the function of specifying access rights to resources related to information security and computer security in general and to access control in particular.

The term "help request" in the context of the invention, may refer generally, though not necessarily, to data and metadata of a real-world job, task, or service request. The term "offer to help," "response communication" or "reply" in the context of said request may refer generally, though not necessarily, to data and metadata generated as a response to said help request.

In the context of a help request, a "requester" may refer generally, though not necessarily, to one or more users creating and/or managing said help request. In the same context, the term "helper" may refer generally, though not necessarily, to one or more users provided the opportunity to complete said help request. Requesters and helpers may include, but are not limited to, individual people, a group of individuals, a company, a government agency, or any other entity as would be understood by a person having ordinary skill in the art.

In the context of a help request, the term "computing device hosted conversation" may refer generally, though not necessarily, to data and metadata from computer implemented communications exchanged between an access device associated with at least one requester and another access device associated with at least one helper. The computing device hosted conversation may be communicated via at least one network, and may include, for example, text messages, sound, images, video, other digital media.

The present invention may relate generally to a computer implemented system and method for the management of help requests, whereby users may solicit assistance for various tasks and/or services from the public-at-large. Exemplary embodiments as shown and described herein enable users to submit help requests to an application server via an access device, whereupon the requests are transmitted to one or more potential helpers via a communications network. In some exemplary embodiments, the transmission of help request data may occur selectively based on a set of predetermined criteria. For example, a submitted help request may only be accessible and/or viewable to potential helpers defined within a specific geographical area. Help requests may be displayed through a graphical user interface, from which the potential helpers may browse, filter, and respond to the submitted requests.

A response communication or "reply" to a help request may indicate a potential helper's availability or willingness to complete the submitted request. Such responses may be communicated back to the original requester for further action, as described in more detail below. In some exemplary embodiments, for example, the requester may be prompted to enable communication between the requester and the helper(s) associated with the response communication(s). If the requester decides to enable communication, a communication portal may be provided, allowing direct correspondence between said requester and helper(s). The communication portal may allow the requester to communicate with one or more helpers individually as well as in a group setting without necessarily disclosing additional contact information, such as an email address or telephone number. This one-to-many relationship thereby allows the requester to manage one or more helpers simultaneously per each help request submission.

In some exemplary embodiments, a helper may be restricted to sending a single response communication per help request. Once such a response is sent to the requester, further action may only be initiated by the requester, such as enabling the communication portal or accepting an offer for help. A requester may opt to close a help request, thereby preventing the submission of new offers for help. Nevertheless, the helpers who submitted offers prior to the closing of said request may still view the help request and potentially communicate with said requester (as long as their respective computing device hosted conversations are enabled). A requester may selectively enable computing device hosted conversations associated with said request.

In some exemplary embodiments, means may be provided to disable a computing device hosted conversation, preventing users from receiving any further communications regarding that computing device hosted conversation in the future.

In some exemplary embodiments, the requester may edit or cancel a request. When a request is canceled, all computing hosted conversations may become disabled.

In some exemplary embodiments, helpers may filter displayed help requests according to a set of preferences. For example, the helpers may filter the help request by geographical location, search term, and/or a degree of separation from the helper. A helper that has previously helped a requester, may leave reviews for the requester, and may even re-sort and prioritize requesters that are particularly trusted.

In some exemplary embodiments, a requester may thank the helper(s) associated with a help request via a process herein referred to as "thank you" activity. "Thank you" activity may include: a requestor uploading an image and/or text via an access device; said image and/or text relating to the helper(s), and being stored in a database coupled to the network server. The network server may then distribute the image and/or text to the corresponding helper(s) via at least one network. "Thank-you" activity may help to increase the helper's status or credibility within the network system.

Some exemplary embodiments may allow requesters and helpers to grant and/or remove permissions for transmitting and/or receiving help requests. For example, some help requests may be created as public help requests while other help requests created as private help requests. A public help request may be accessible to all users to view, for example, a short description of the help request, and to submit a response communication in reply to said help request. A private help request, on the other hand, may have limited visibility to only those helpers given specific permission by the requester. Said permissions could be associated to one user or to a group of users, including, but not limited to, a work organization, friends, family, etc.

In some exemplary embodiments, a requester may provide different levels of permission on a single help request. The permission associated to a group of helpers could, for example, allow said group of helpers to see more information about the help request than the rest of the helpers of the system.

A helper may request specific permission grants from one or more requesters, thereby elevating the helper's permission status upon authorization. Receiving such authorization may place the helper within a specific "helper group" of the corresponding requester, or could alternatively associate the helper's profile with a "helper group." A requester may transmit a single help request to multiple helpers within the same group. A requester may also manually group helpers to send a help request to, such as by selecting a subset of available/viewable helpers or by filtering the available/viewable helpers by certain attributes, such as geographical distance from the requester, work ability, organization affiliation, etc.

In some exemplary embodiments, helpers may grant or deny permissions from one or more requesters to transmit help requests or to allow the requester(s) to group the helpers into one or more categorized groups. A helper may further grant or deny authorization to communicate with a requester, thereby automatically enabling/disabling a communication protocol (e.g., a text chat window, audio phone call, video teleconference, etc.). Furthermore, helpers may request permission to monitor certain requester's submissions via a Watch List.

Allowing both helpers and receivers to authorize permissions for carefully selected helpers/receivers or for certain helpers/receivers sharing certain attributes can increase the security and trustworthiness of the system, and help narrow down choices for an otherwise crowded field.

Generally referring now to the Figures, FIG. 1 may illustrate an exemplary embodiment of a help request management system 100 in accordance with the present invention. The task request management system 100 may include a server 120, a network 130, and one or more access devices 110*a*, 110*b*, . . . 110*n* (collectively referred to herein as access device 110). Each access device 110 may correspond to one or more users 100*a*, 100*b* . . . 100*n* (herein referred to as user 100). Although FIG. 1 only depicts access devices 110*a*, 110*b*, and 110*n*, it is contemplated that any number of access devices may communicate with the network 130. The access devices may be any type of computing device, including but not limited to a cellular phone, laptop, desktop computer, watch, wearable device, or any other suitable computing device as would be known by a person having ordinary skill in the art. While FIG. 1 illustrates the access devices 110 connecting to one server system, in reality, the access devices may connect to any number of networks and servers.

Said access devices 110 may include a module or program in any one or more computer languages that will implement, in combination with the server system(s), the method described in the present invention. The access devices 110 may further include graphical user interfaces for displaying and communication information.

A user 100 may be an individual, a group of individuals, a company, a government agency, or any other entity as would be understood by a person having ordinary skill in the art. In some instances, the user 100 may be a requester, creating and/or managing a help request. In other instances, the same user 100 may be a helper, given the opportunity to complete said help request. In other words, users 100 may play the role of requester or helper depending on each help request.

Figure 2:
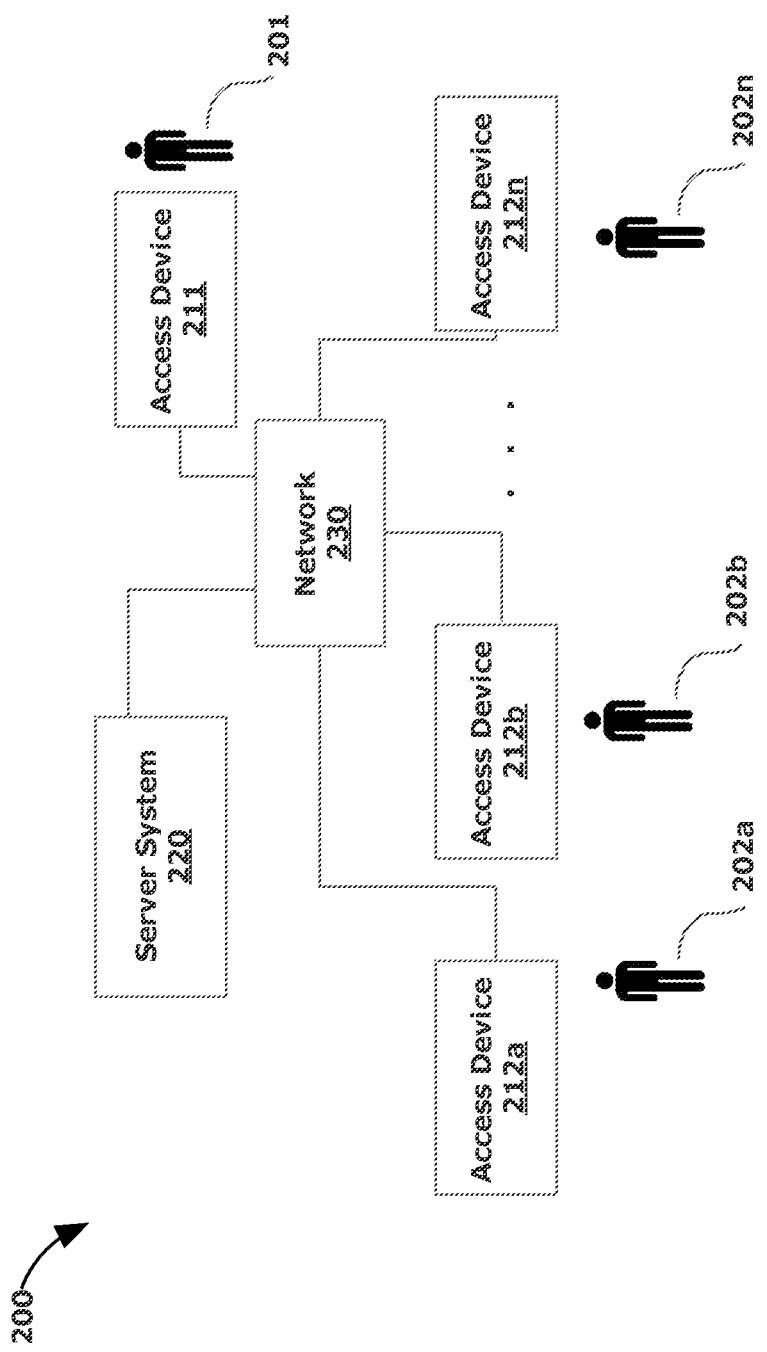
FIG. 2 is a block diagram illustrating an example of the method to manage one help request and one or more computing device hosted conversations related to that help request.

FIG. 2 may illustrate another exemplary embodiment of a help request management system 200 in accordance with the present invention. The task request management system 200 may include a server 220, a network 230, one or more helper access devices 212*a*, 212*b*, . . . 212*n* (collectively referred to herein as helper access device 212), and at least one requester access device 211. Each helper access device 212 may correspond to one or more helpers 202*a*, 202*b* . . . 202*n* (herein referred to as helper 202), and the at least one requester access device 211 may correspond to a requester 201. The access device(s) 211, 212 connect via at least one network 230 to at least one larger computing system referred to as the server system 220. Said server system(s) may include one or more servers and optionally one or more means for data storage.

Data storage may include at least one database for storing user data. In some exemplary embodiments, the database may include a user database section for storing user data, such as contact information, profile information, and status. The database may further include a request database section for storing information related to the help request (e.g., a description of the help, geographical information related to the help request, and a status of the help request), and a conversation database section for storing information associated with a computing device hosted conversation. Preferably, the database also includes a request group database section for enabling requesters to control which user(s) can view their request(s); and a watch group database section for storing permissions information.

Users 201, 202 may generally access the system 220 through a graphical user interface on their access devices 211, 212, such as through a web portal or a mobile app. Said user interface may be configured differently for requesters and helpers.

Each access device 202, 212 may be capable of storing or executing program code. The access device may contain a module or program in any one or more computer languages that will implement, in combination with the server system, the method described in the present invention.

Although only three helper access devices 212 and helpers 202 are shown, it is contemplated that there can be any number of access devices 212 and helpers 202 for a single help request. Furthermore, there can be any number of help requests in the system and any number of computing device hosted conversations associated to each help request.

Figure 3:
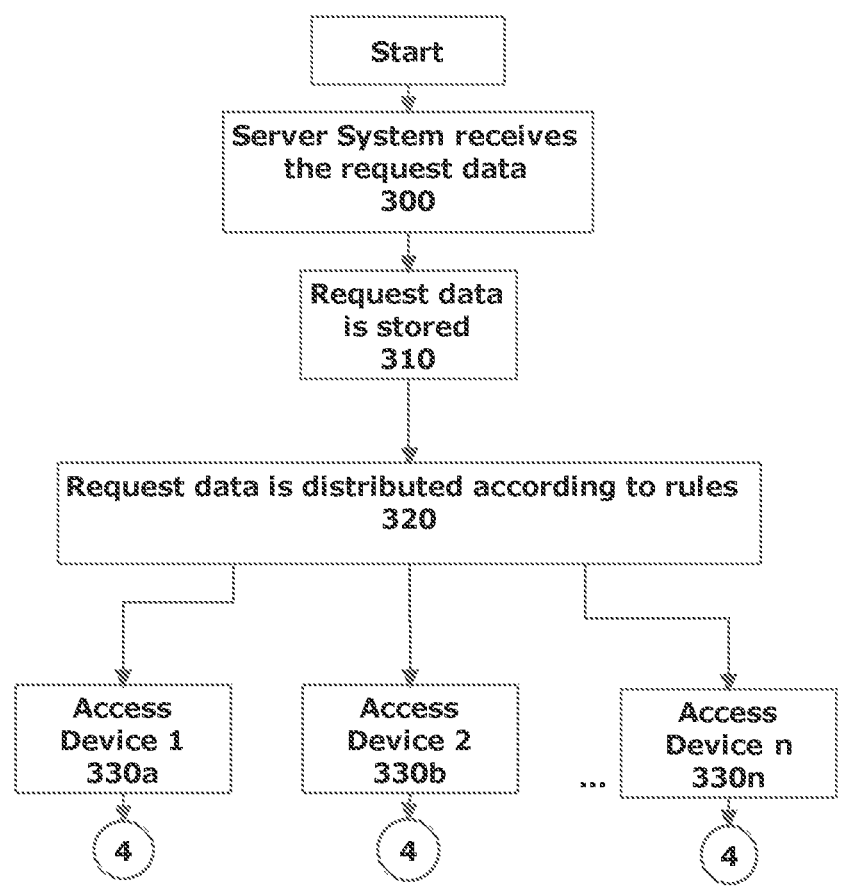
FIG. 3 is a block diagram illustrating an example of the method to manage a help request and computing device hosted conversations originating from said help request.

FIG. 3 may illustrate an exemplary embodiment of a method in the context of one single help request. As in block 300, a server may receive data associated to a new or modified help request from a requester via an access device.

In some exemplary embodiments, there is a counter herein referred to as Number of Helper Offers associated to each help request that collects the total number of helpers who have offered help. There may also be a state or status associated with each help request. In block 310, the help request data may be stored in the server system via the network. In 320, data associated to the help request may be distributed to at least one other access device associated with at least one other user. Said data associated to said help request may be distributed to access devices according to rules or permission levels.

In some exemplary embodiments, an access device is configured to present a user interface screen, herein referred to as tab A. Tab A includes requests that have been created or are being managed by someone other than the user associated to the access device that will display tab A.

The method for generating tab A may include the following steps: at least one access device sends data over at least one network to the server system, said data includes data that identifies the user of said access device, geographical location data of the device, and optionally data regarding one or more keywords. The server system may send data to the access device, save the data, and display the data.

Figures 0A, 4:
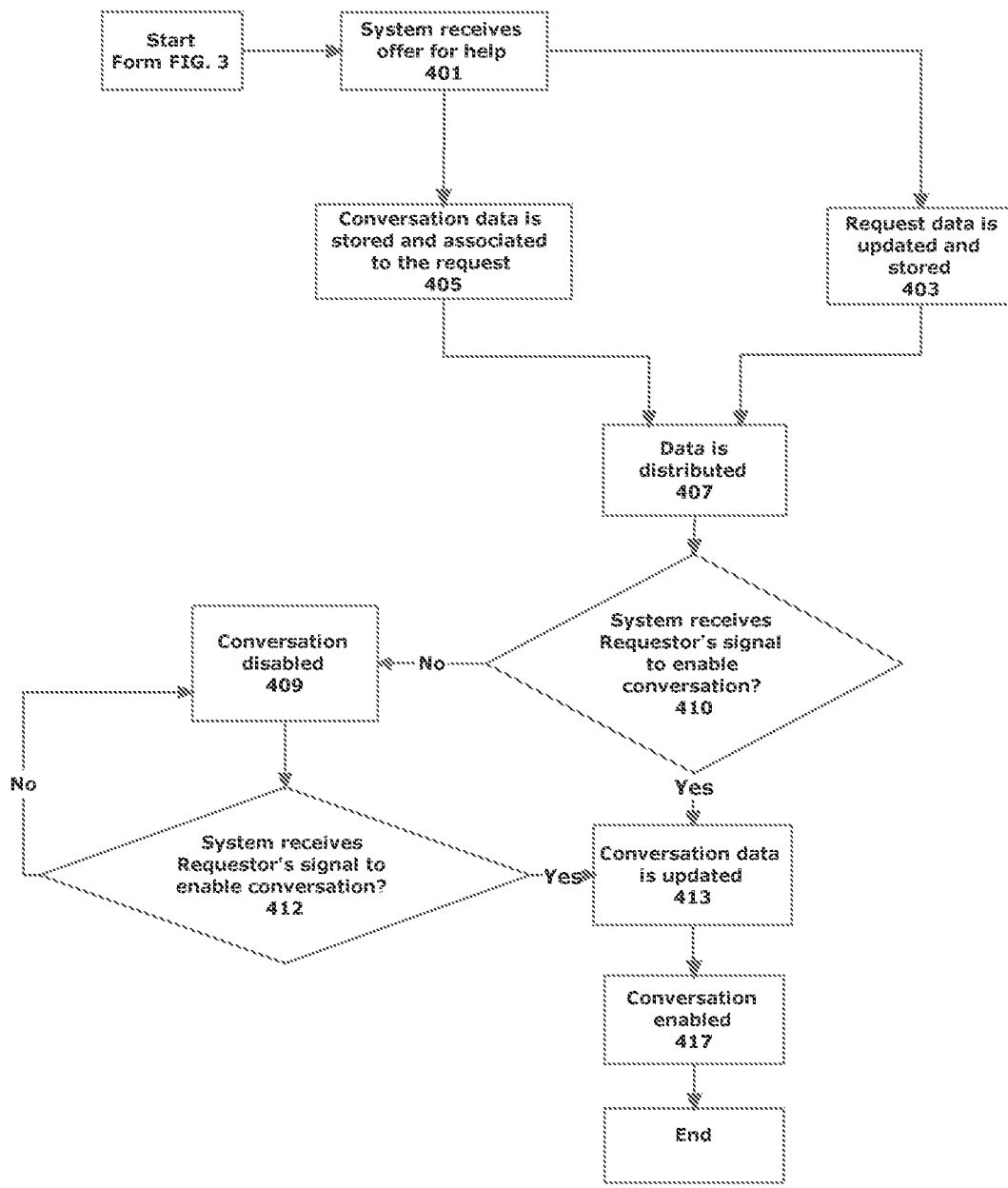
FIG. 4-0*a*-4-5*a* is a flow chart illustrating an example of the method when used to manage one computing device hosted help request and related computing device hosted conversations.
Figures 0B, 4:
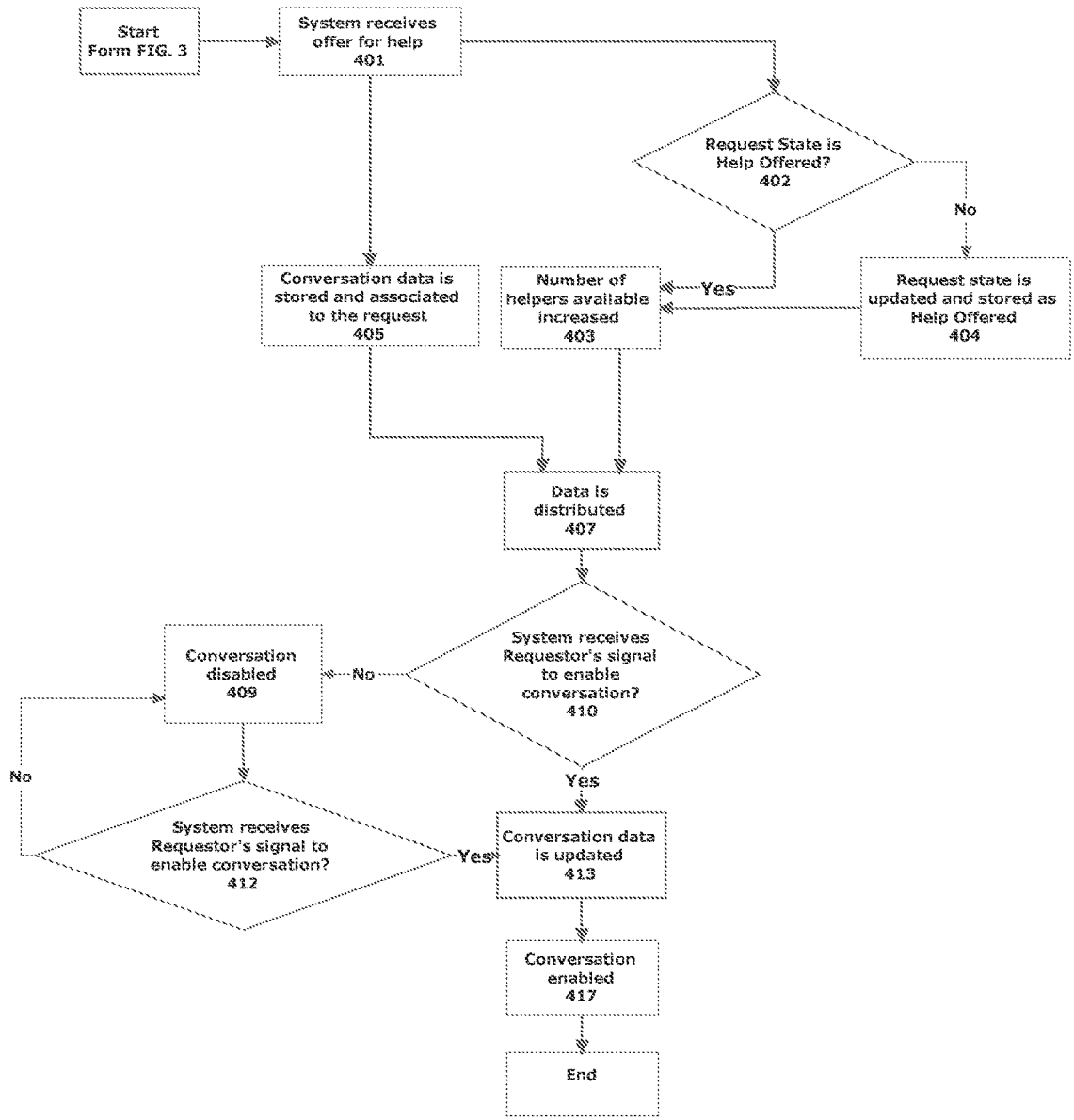
Figures 1A, 4:
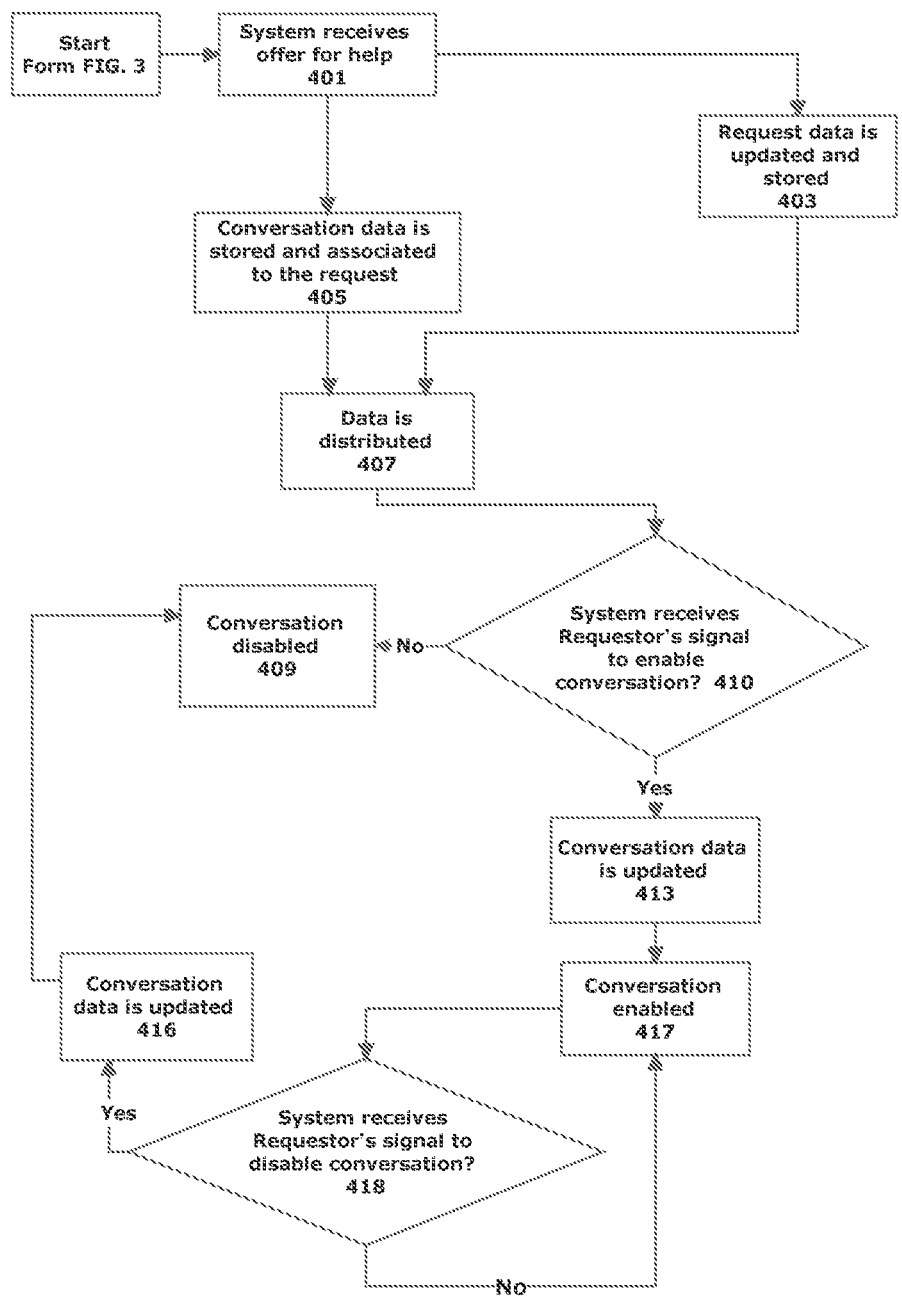
Figures 1B, 4:
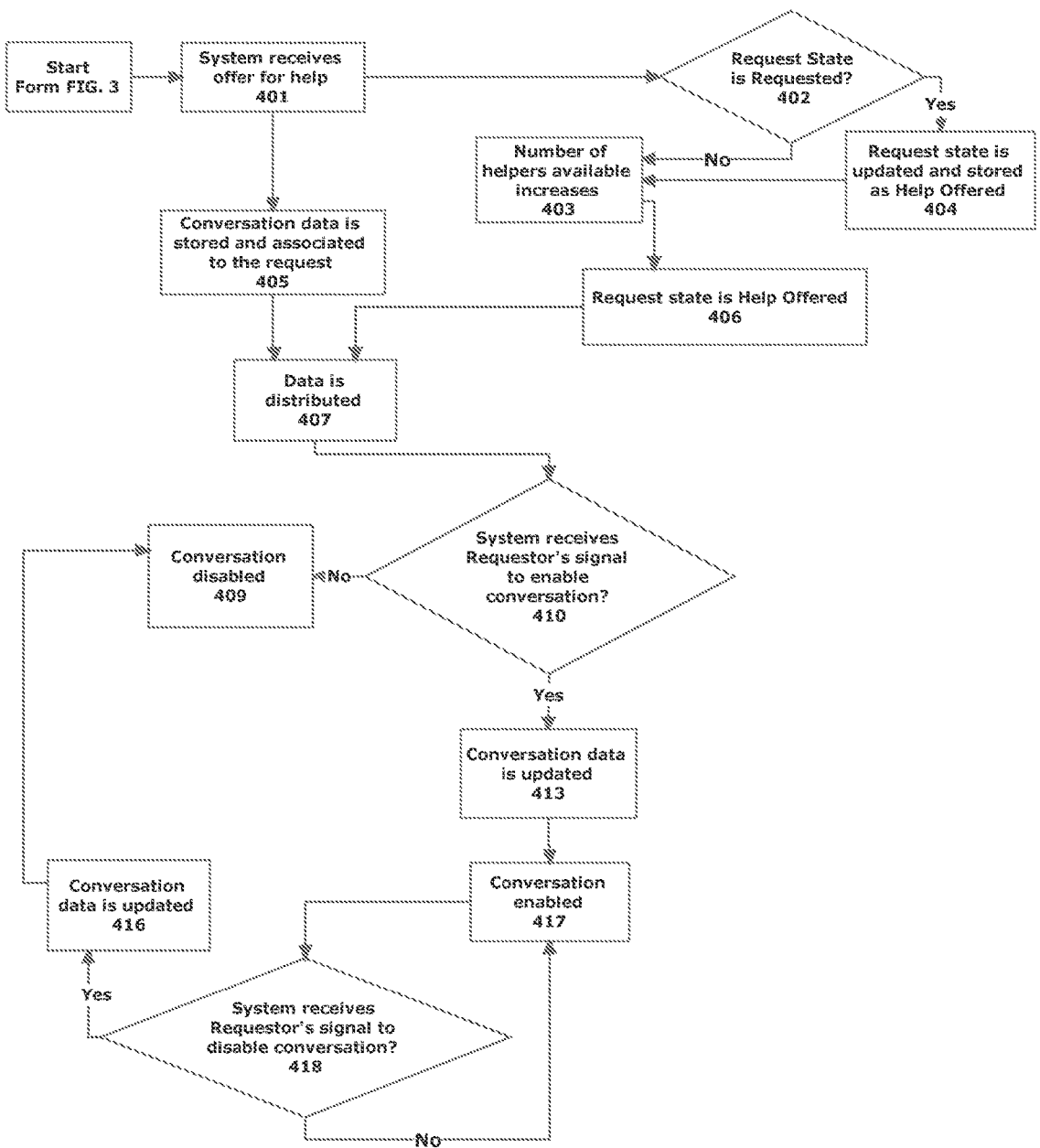

FIG. 4-0A may illustrate an exemplary method to enable and/or disable conversations between requesters and helpers. The server system may receive data from either a requester associated device, or a helper associated device to disable the computing device hosted conversation. This option allows the user associated to the access device who took the disabling action to stop receiving future computer implemented communications and/or notifications from said computing device hosted conversation. At least in one embodiment, means to enable the computing device hosted conversation again may become available to said user who disabled the computing device hosted conversation.

If the server system receives data form a requester associated device to disable the computing device hosted conversation 418, data reflecting the disabling action of the requester is stored 416. The computing device hosted conversation will remain disabled 409 unless the requester enables it again 410. The requester may choose to enable the computing device hosted conversation again 410, and data is stored reflecting said enabling action 413.

Figures 2A, 4:
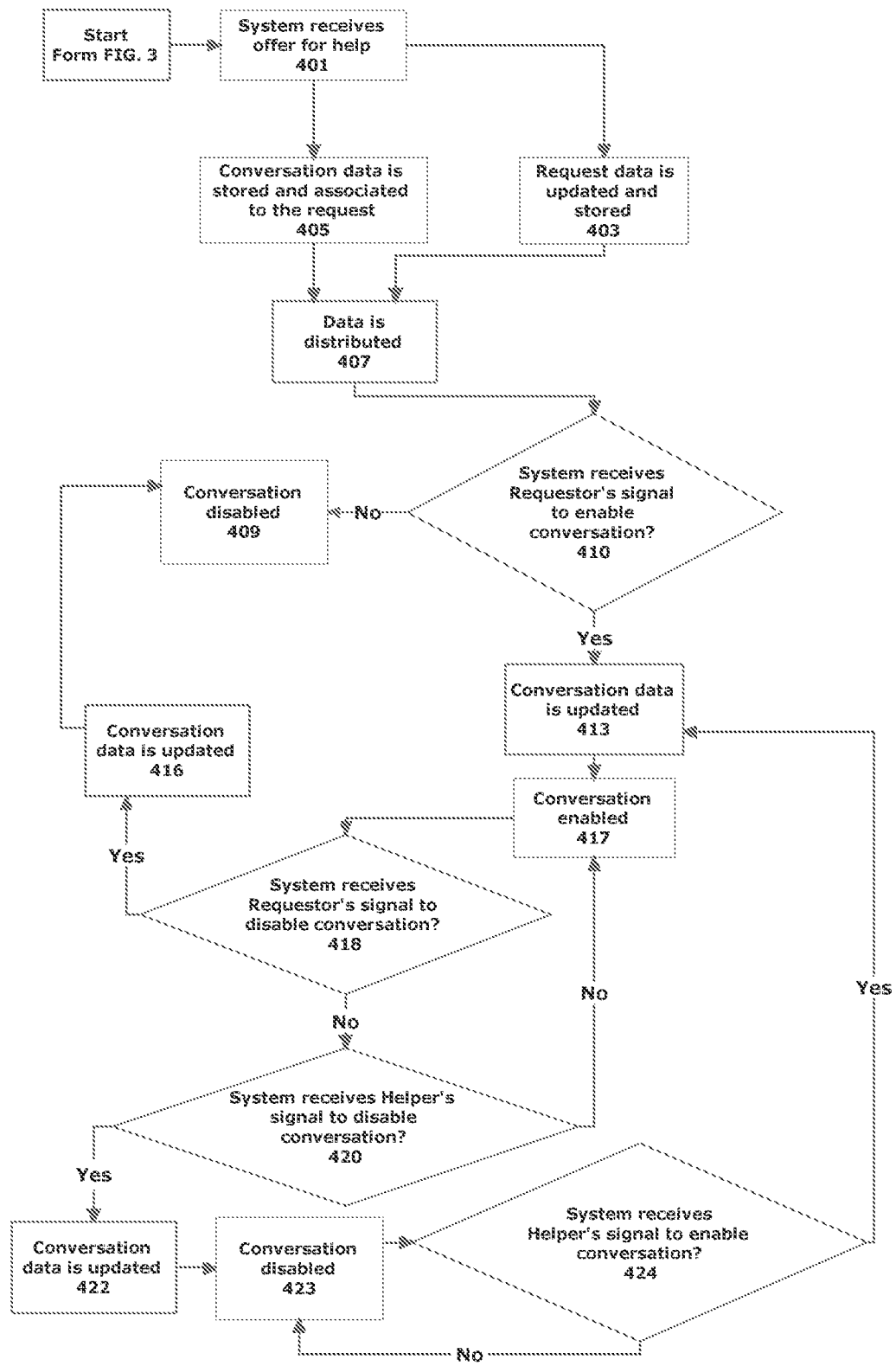
Figures 2B, 4:
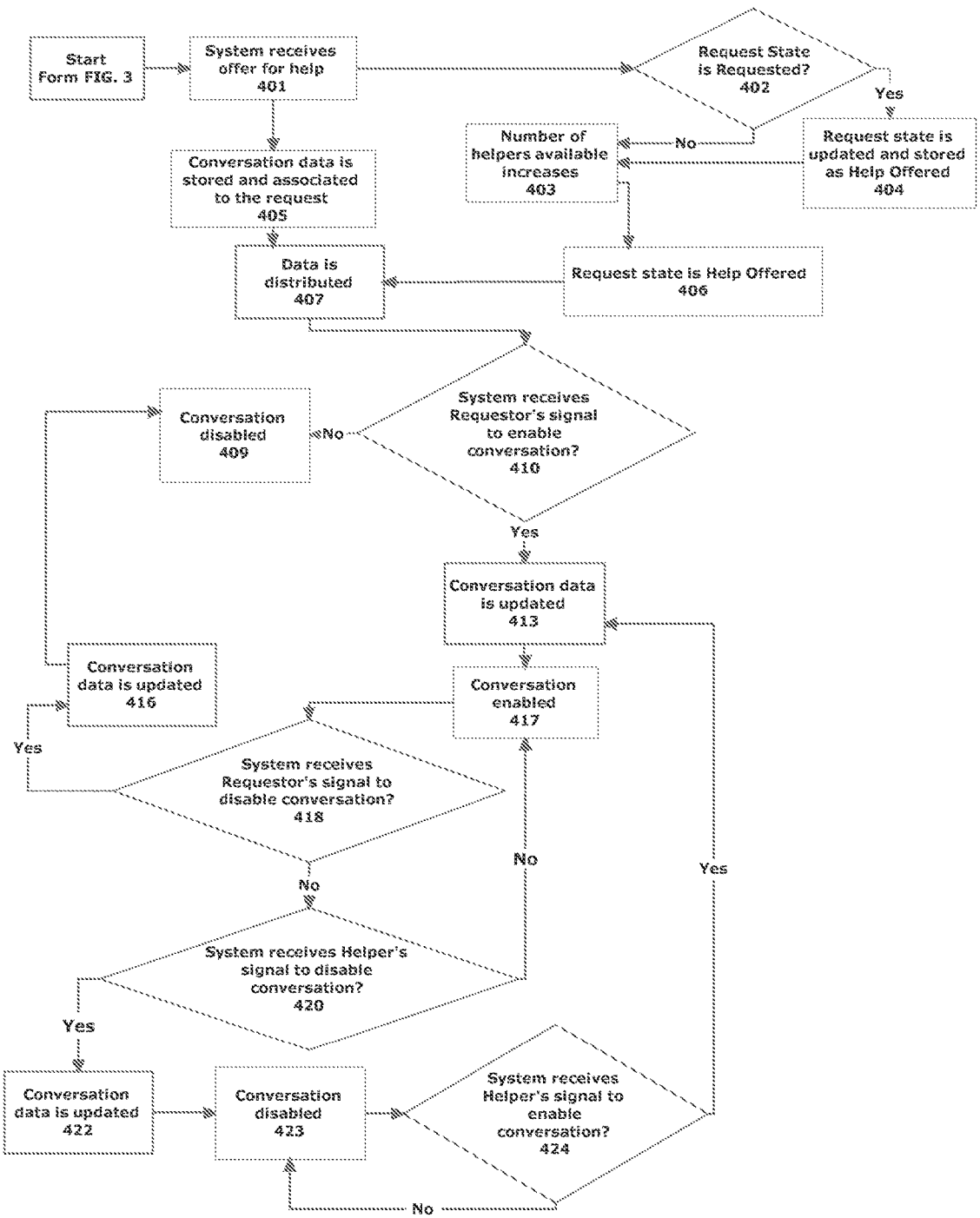

FIG. 4-2a may illustrate an example of at least one of the embodiments of the invention where the server system may receive data from the helper associated device to disable the computing device hosted conversation 420 and in that case, data indicating the disabling action by the helper is stored 422. The helper may also enable the computing device hosted conversation again 424, and data indicating this enabling action by the helper is also stored 413.

It may be apparent to someone skilled in the art that when the computing device hosted conversation has been disabled by the requester, only a signal received from a requester associated device can enable said computing device hosted conversation again. Similarly, when the computing device hosted conversation has been disabled by the helper, only a signal from that helper associated device must enable said computing device hosted conversation again in order to continue to receive computer implemented communications from said requester. In at least one embodiment, the disabling action will also be made visible to the other members of the computing device hosted conversation.

FIG. 4-0b, 4-1b, 4-2b may illustrate examples of at least one of the embodiments of the invention where the help request data includes an indication of the state of the help request. In this example, a help request may start in an initial state referred to as Requested 402. Following the first offer to help, the help request state may be updated and stored to a state that indicates that at least one helper has offered his or her help 404, referred to as Help Offered.

Figures 3A, 4:
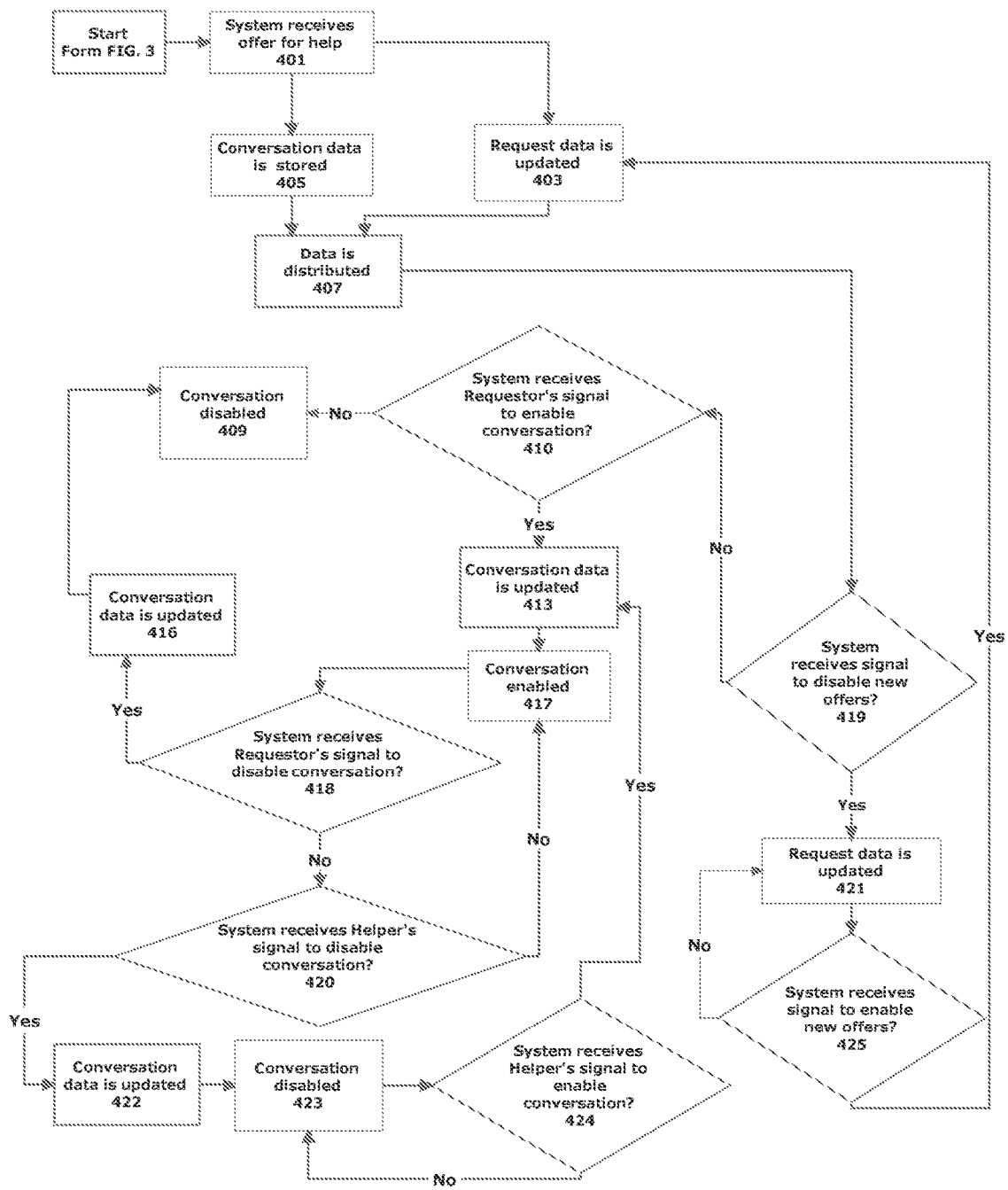

FIG. 4-3a may illustrate an example of at least one of the embodiments of the invention where an additional step 419 is shown. 419 determines if the requester chose to stop receiving future offers to help for said help request. If the requester elected to stop future offers to help, data about said action is stored 421 and said help request will no longer be shown to users other than the requester and the helpers with whom computing device hosted conversations already exist. Any time after taking said action to stop future offers for help, said requester may take another action to reopen said help request to future offers for help again 425. Following the reopening action, the help request data is updated 421 and the data is distributed again.

In at least one of the embodiments, said action by the requester to stop future offers to help associated to the help request may be stored as a help request state referred to as Closed.

Figures 3B, 4:
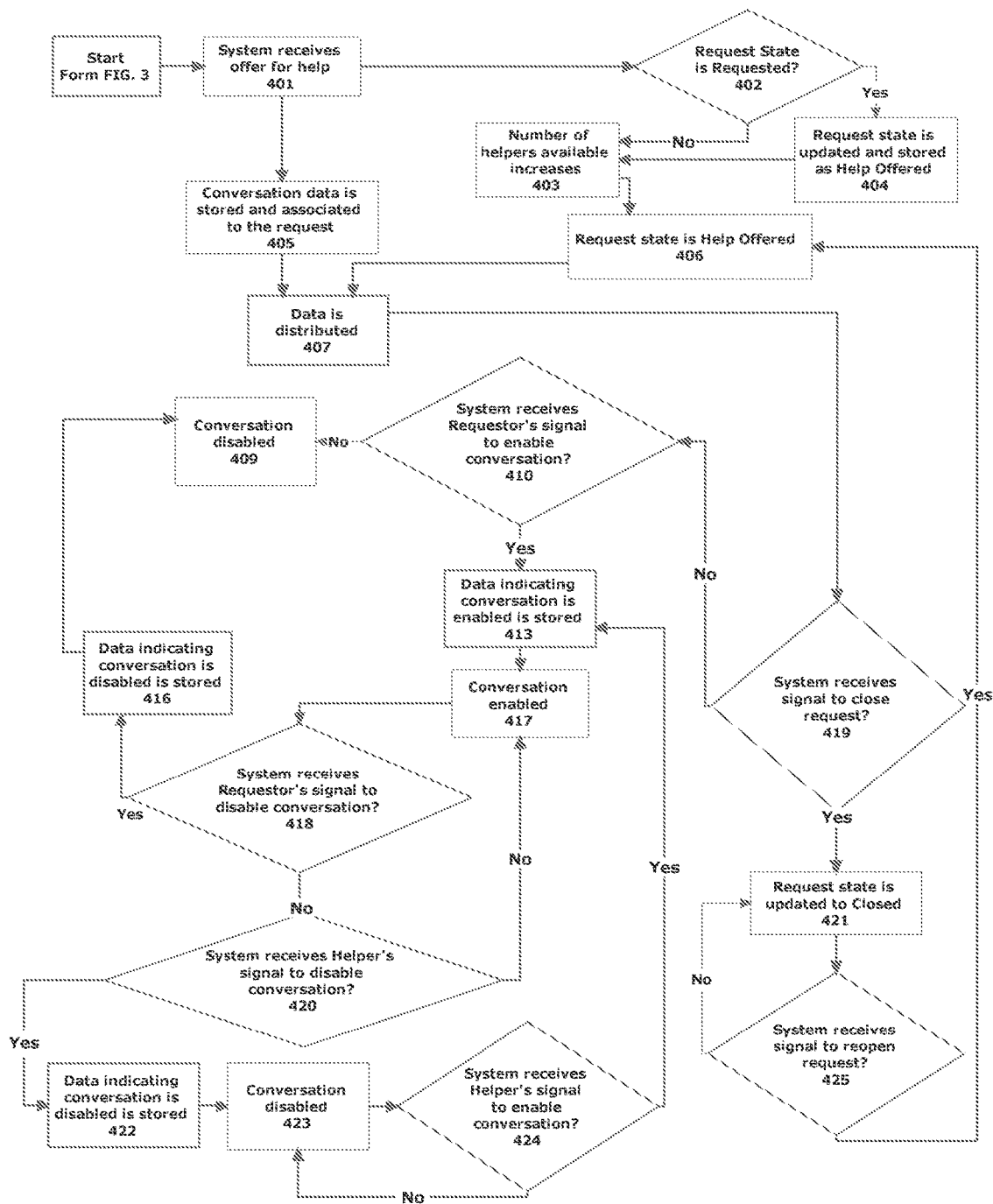

FIG. 4-3b may illustrate an example of the embodiment of the invention where the requester chose to close the help request 419 and said action to close the help request will be stored as a help request state referred to as Closed 421.

Figures 4, 4A:
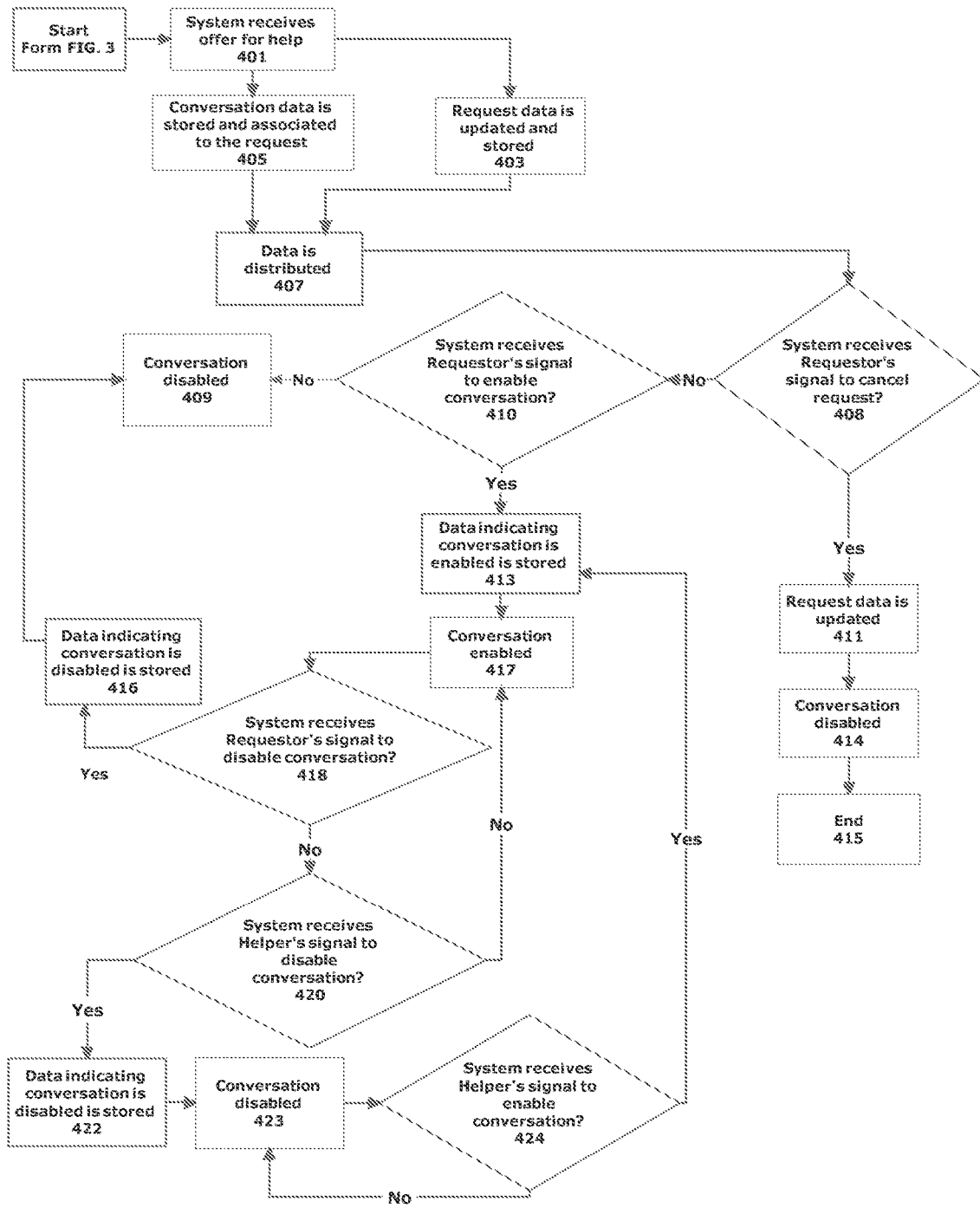

FIG. 4-4a may illustrate an example of the embodiment of the invention where the server system receives data indicating that the requester wishes to cancel the help request 408. The help request data may be updated 411. When the requester cancels said help request may no longer be visible to helper(s) or requester(s). Once the help request has been cancelled, it will stay cancelled (is not reversible). When said help request is cancelled, all computing device hosted conversations associated to said help request may be disabled.

In at least one of the embodiments, said action to cancel the help request may be stored as a help request state referred to as Cancelled.

Figures 4, 4B:
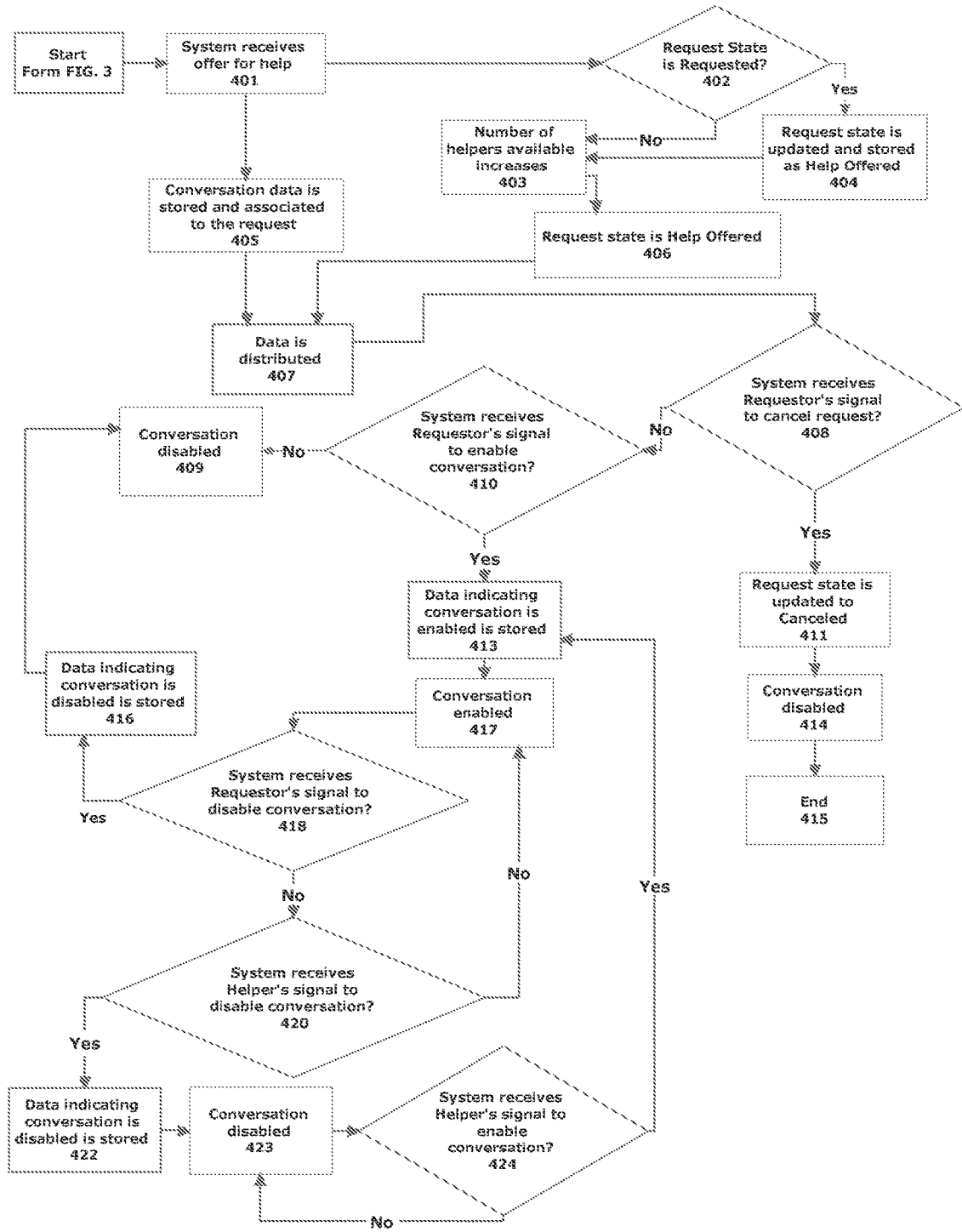

FIG. 4-4b may illustrate an example of the embodiment of the invention where the requester may cancel the help request 408 and said action to cancel the help request may be stored as a help request state referred to as Cancelled 411.

Figures 4, 5, 5A:
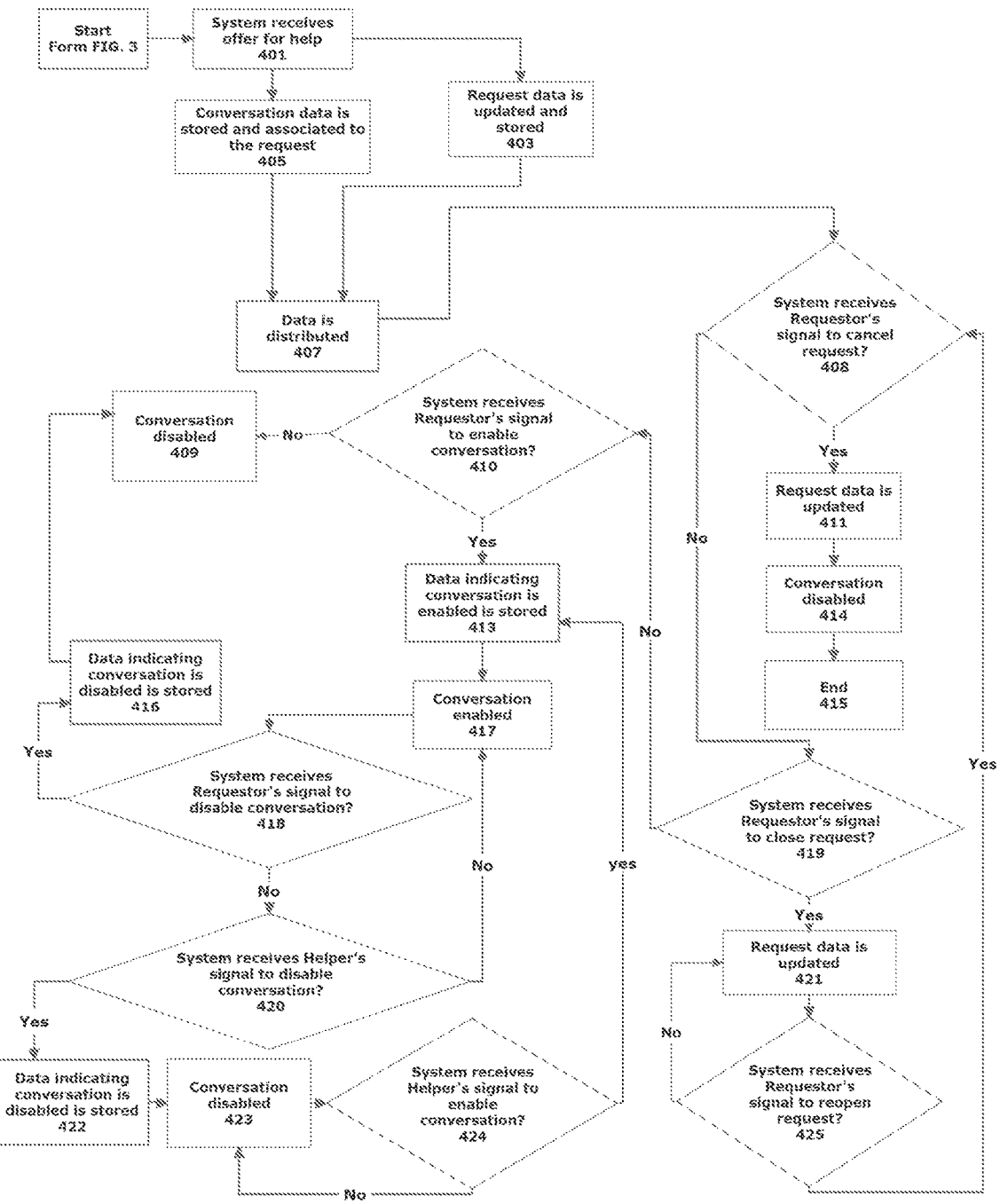

FIG. 4-5a may illustrate an example of the embodiment of the invention where the requester may choose to stop future offers for help and said requester also has the option to cancel said help request.

Figures 4, 5, 5B:
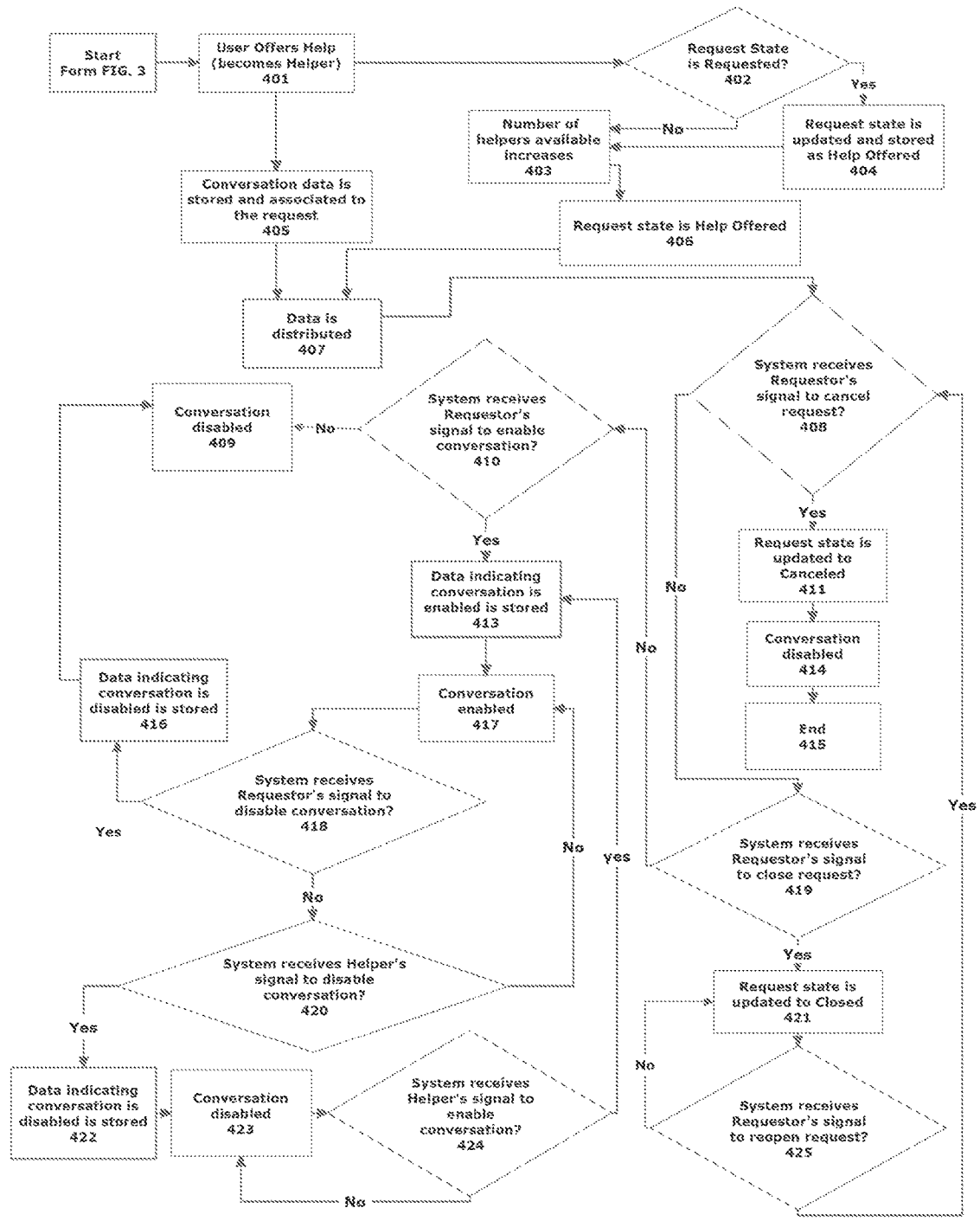
Figure 5:
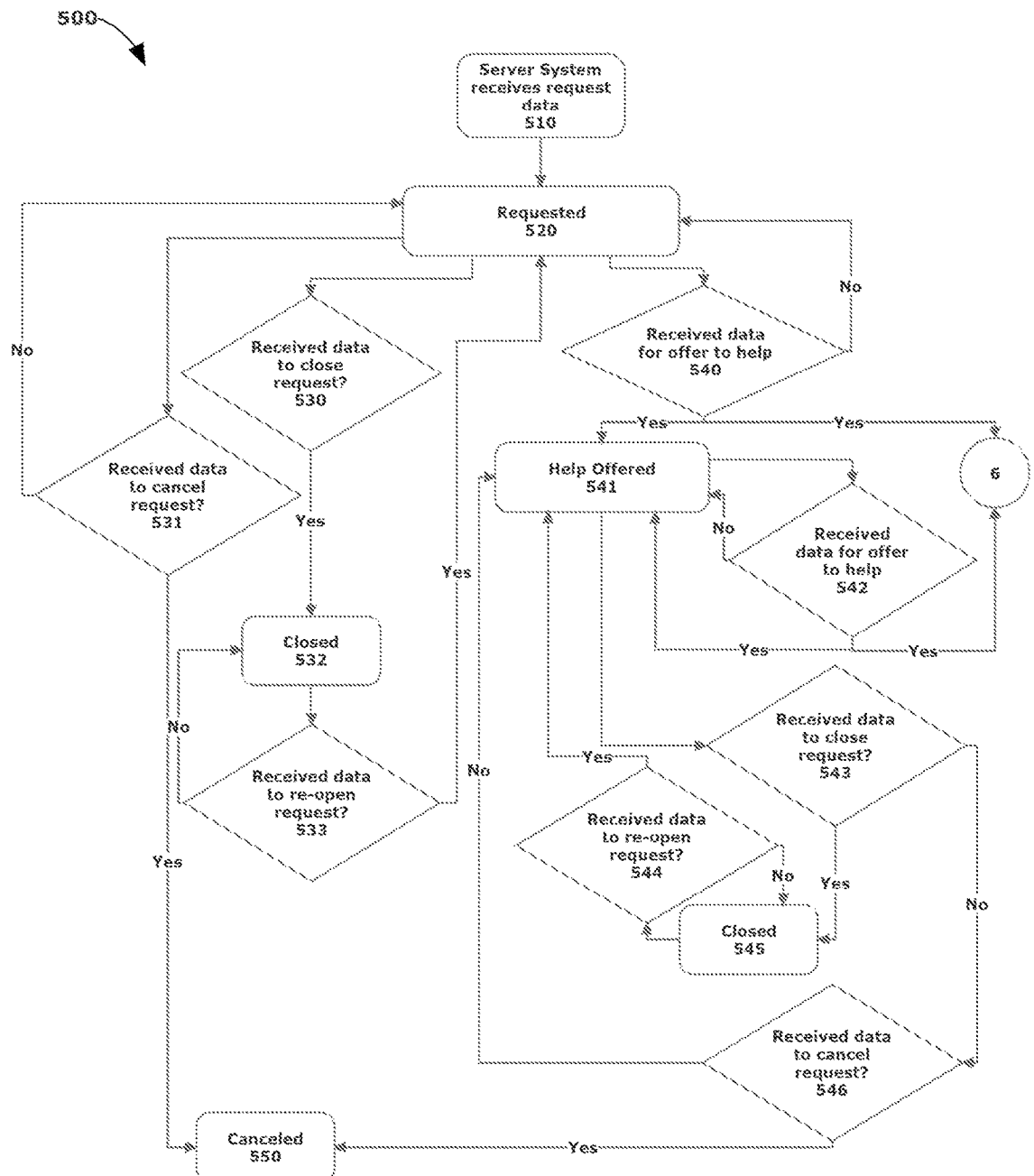

FIG. 4-5b may illustrate an example of the embodiment of the invention where the requester may cancel or close the help request 408 or 419 and said action to cancel or close the help request will be stored as a help request state referred to as Cancelled 411 or Closed 421.

FIG. 5 may illustrate an example of the embodiment of a portion of the invention where some of the help request states are shown. During the initial step 510, the server system receives the help request related data, including a description of the requested help and identification of the requester. Said help request data may be sent from the access device associated to said requester by way of at least one network to the server system(s). The help request may be created in a state referred to as Requested 520. During the Requested state, the help request has been created successfully but no offer for help has been sent to the server system yet. If at least one offer for help is sent to the server system, the help request state is changed to Help Offered 541. When a help request is in the Help Offered state, it is known to the server system that at least one user has offered help with said help request. If an additional offer for help is sent to the server system, the help request's state remains as Help Offered. Data regarding each offer for help is then sent to the access devices of the requester and helpers.

From the Requested state or the Help Offered state, the requester is allowed to choose to close the help request 530/543. In this case, data indicating that the help request has been closed is sent from the requester's access device to the server system and the help request state is changed to Closed 532/545. The Closed state may be reversible. A requester associated device may be configured so that the requester can choose to re-open said help request if desired 533/544. Another possible choice made available for the requester through said requester's access device(s) is to cancel said help request 531/546. If data indicating that the help request must be cancelled is received by the server system, the help request state changes to the state referred to as Canceled 550. The Canceled state is not a reversible state.

In at least one embodiment, once the help request is in the closed state, access devices associated to users who have already offered help are able to continue to communicate with the requester in the computing device hosted conversation. During the Closed state, a help request data will not be visible to access devices associated to users other than the requester and those users who had already offered their help before the help request was closed (helpers). This state allows the requester to stop getting offers for help from new users. During the Cancelled state, the help request is no longer visible to any user associated access device and the computing device hosted conversations that had been associated to said help request will also be disabled.

Figures 1, 6:
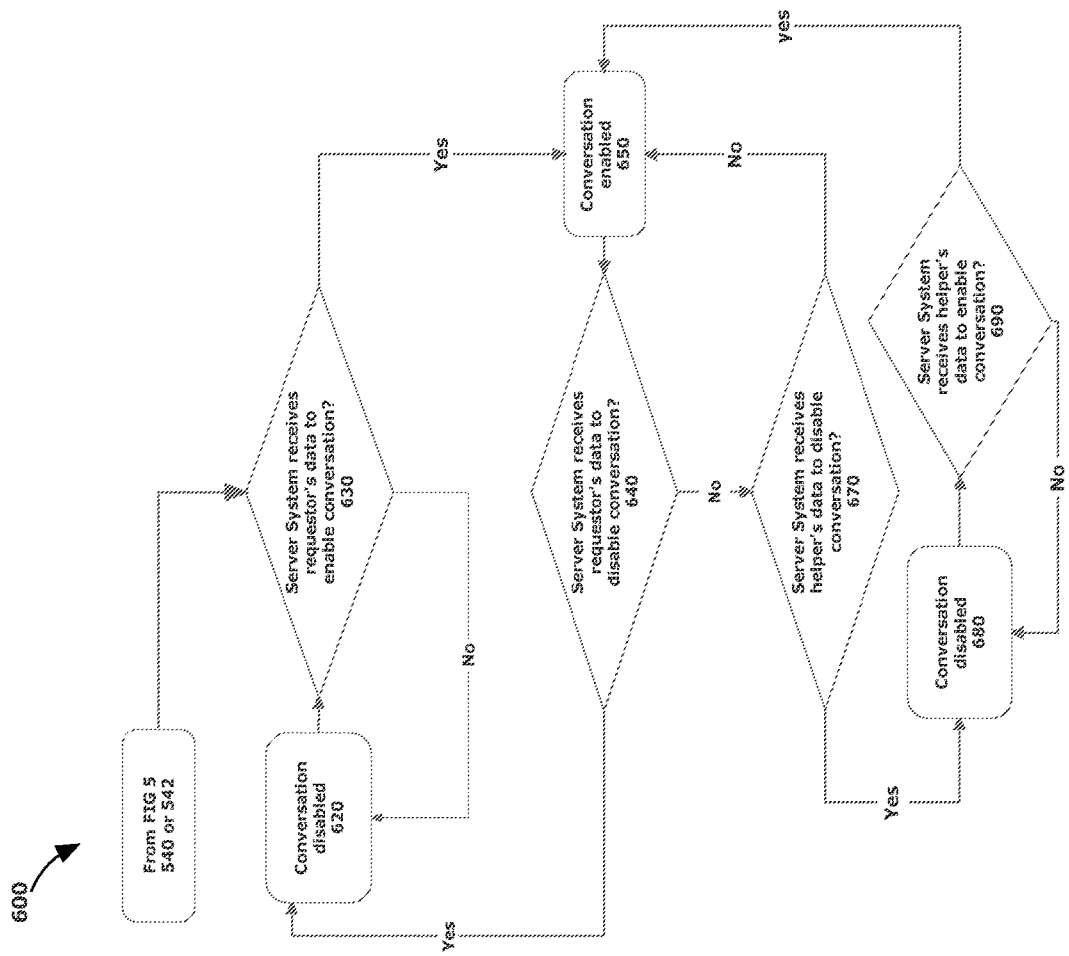

FIG. 6-0 may illustrate an example of the embodiment of the portion of the invention when the server system receives data from a user's access device indicating said user offers to help on a help request. Said server system generates data about a computing device hosted conversation between requester and helper. Said computing device hosted conversation will be in a default state of disabled 620 unless the requester enables the computing device hosted conversation 630. The requester's associated access device will be configured such that said requester can enable the computing device hosted conversation by sending a computer implemented message directed to the helper or by assigning the help request to said helper. If the requester enables the computing device hosted conversation, said computing device hosted conversation will be in the Enabled state 650. While in the Enabled state, the requester may choose to continue to communicate with said helper or he may choose to disable the computing device hosted conversation again 640. Once disabled by the requester, said computing device hosted conversation can only be enabled again by the requester.

FIG. 6-1 may illustrate an example of the embodiment of the portion of the invention when the server system receives data from a helper associated access device indicating that said helper offers to help. In this example, the computing device hosted conversation state may change as described in FIG. 6-0, with the additional aspect that the system configures a helper associated access device to allow the helper to disable the computing device hosted conversation 670 as well. Once the server system has received data from the helper's associated access device to disable computing device hosted conversation, said computing device hosted conversation will be in a disabled state 680 unless the helper enables said computing device hosted conversation again 690.

If additional helpers offer their help for said help request, an additional computing device hosted conversation identification is created for each additional helper. The additional computing device hosted conversation identification(s) are also associated to the originating help request, said requester and their corresponding helper.

Figure 7:
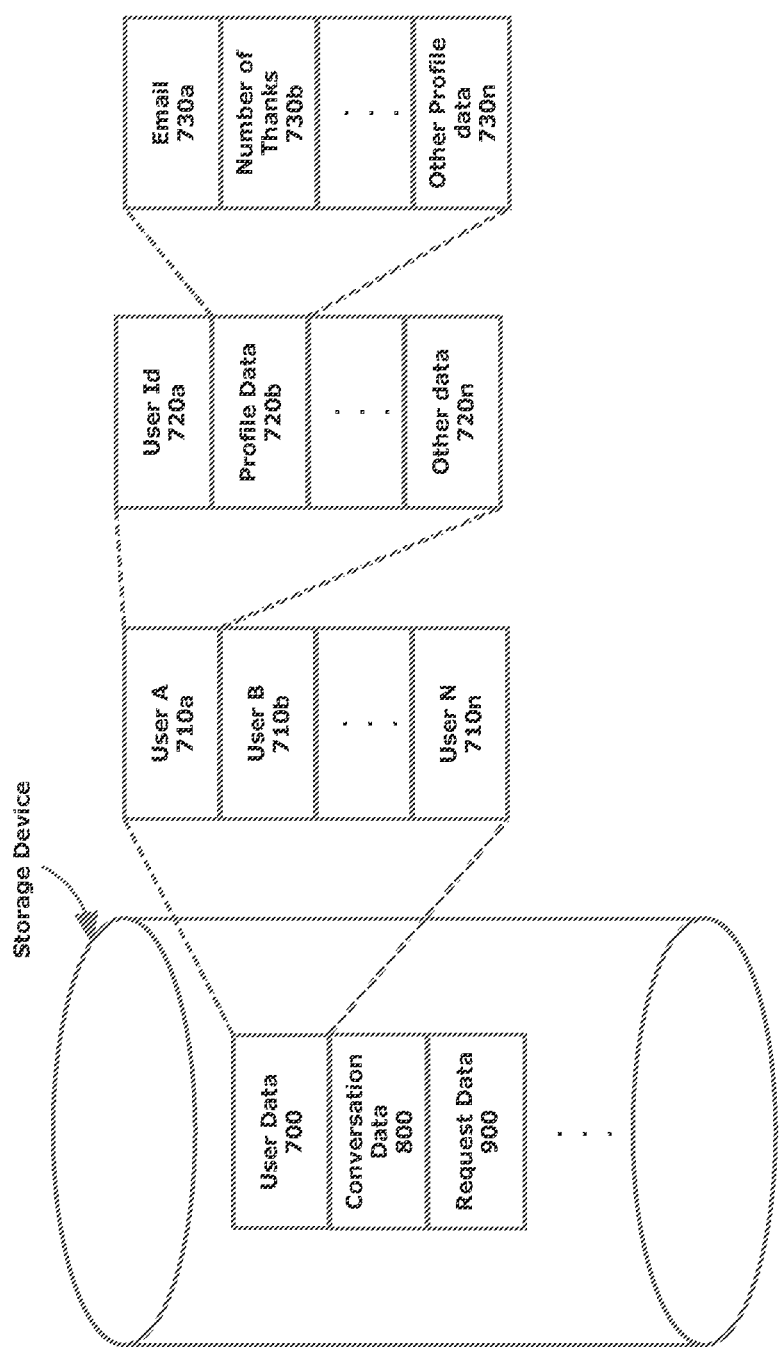
FIG. 7 is a block diagram illustrating an example how data associated to the users of the invention is stored.

FIG. 7 may illustrate an example of how the user data can be stored. Although the figure only shows users 710*a*, 710*b*, and 710*n* (shown as "User A", "User B" and "User N" in the figure for conciseness), there can be any number of users. The Profile Data 720*b* includes: the user's email address 730*a*, the number of thanks the user has received associated to a help request 730*b*, as well as other profile data 730*n*.

The Number of Thanks 730*b* is a counter associated to a user of the invention that will be increased during or as a result of the Thank You activity previously described.

Figure 8:
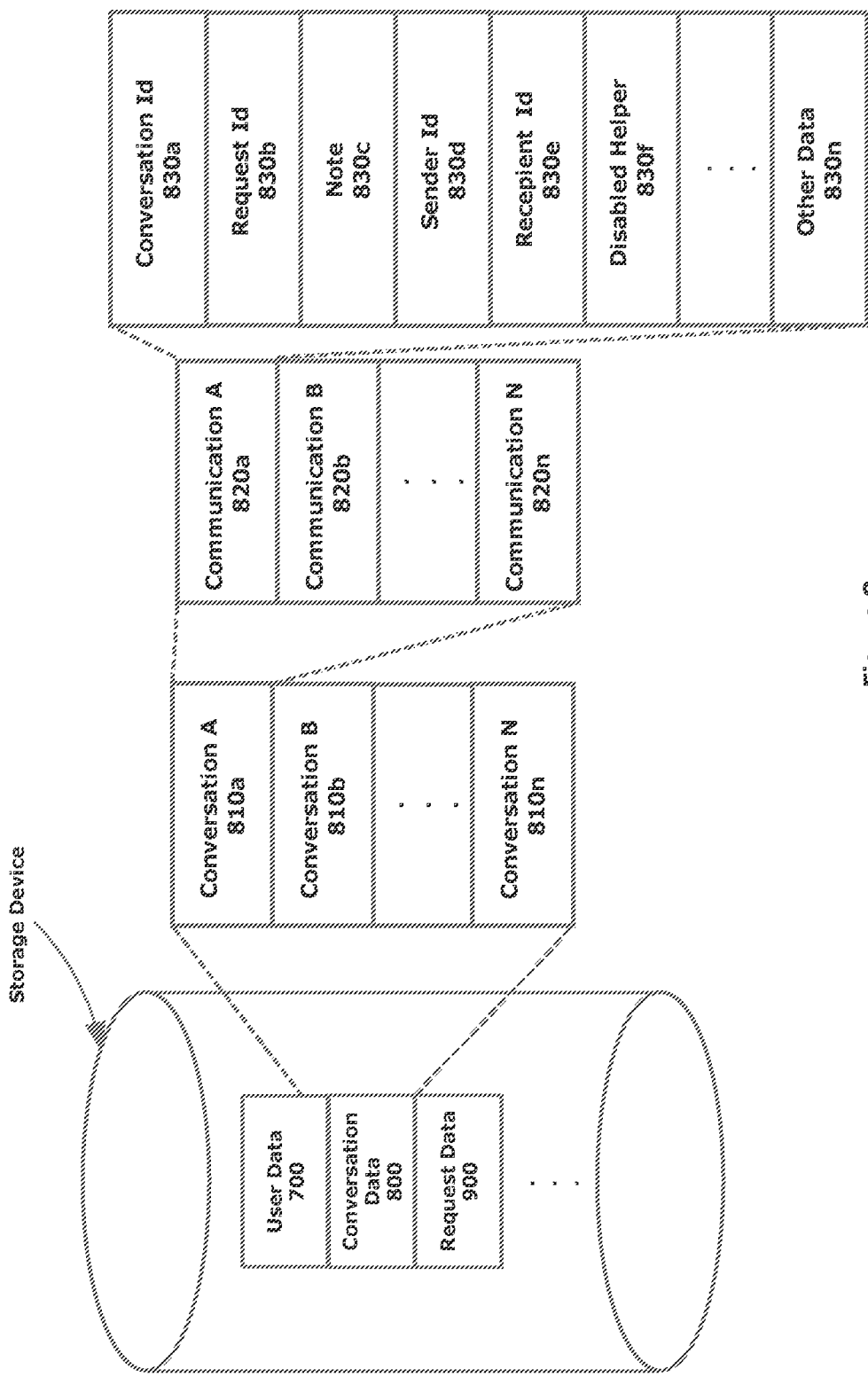
FIG. 8 is a block diagram illustrating an example of how data associated to the computing device hosted conversation(s) is stored.

FIG. 8 may illustrate an example of how the data regarding the computing device hosted conversation can be stored. Although the figure only shows computing device hosted conversations 810*a*, 810*b*, and 810*n* (shown as "Conversation A", "Conversation B" and "Conversation N" in the figure for conciseness), there can be any number of computing device hosted conversations associated to a request. Each computing device hosted conversation may include one or more computer implemented communications. Although the figure only shows computer implemented communications 820*a*, 820*b*, and 820*n* (shown in the Image as "Communication A", "Communication B", and "Communication N" for conciseness), there can be any number of computer implemented communications associated to a computing device hosted conversation. The Request Id is used to associate the computing device hosted conversation data and said computer implemented communications to at least one help request. The Note 830*c* contains an encoded text communication. The Sender Id 830*d* contains data used to identify the user who sent the communication whereas Recipient Id 830*e* contains the data used to identify the user that should receive said communication. Disabled Helper 830*f* stores data regarding the action one of the users may take to disable the computing device hosted conversation 810. In at least one embodiment of the invention, Disabled Helper is a Boolean value that when "true", indicates that the requester has chosen to disable said computing device hosted conversation 810. When Disabled Helper is "false", the requester has not disabled the computing device hosted conversation yet.

Figure 9:
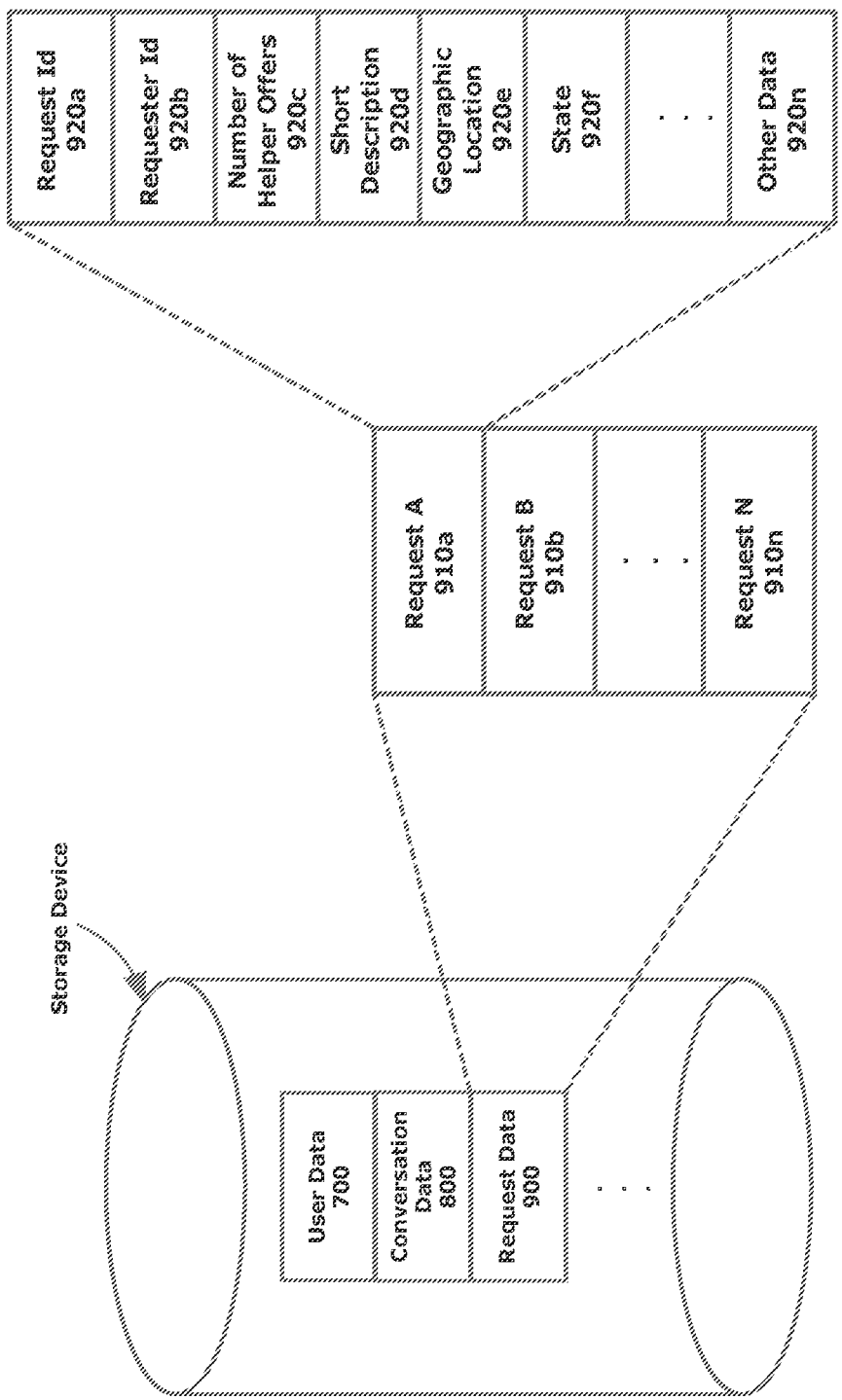
FIG. 9 is a block diagram illustrating an example of how data associated to the help request(s) is stored.

FIG. 9 may illustrate an example of how the data regarding a help request can be stored. The Request Id 920*a* may be used to uniquely identify and associate said help request to other data stored regarding said request including one or more computing device hosted conversation(s). The Requester Id 920*b* may identify the user who was able to create or manage said help request and it also serves to associate the help request data to other data stored including the user data. The Number of Helper Offers 920*c* is a counter that is increased each time a new user offers to help with said request. In at least one embodiment, the Number of Helper Offers may be used to determine how to configure the user interface presented to a requester when an individual request is selected.

Figure 10:
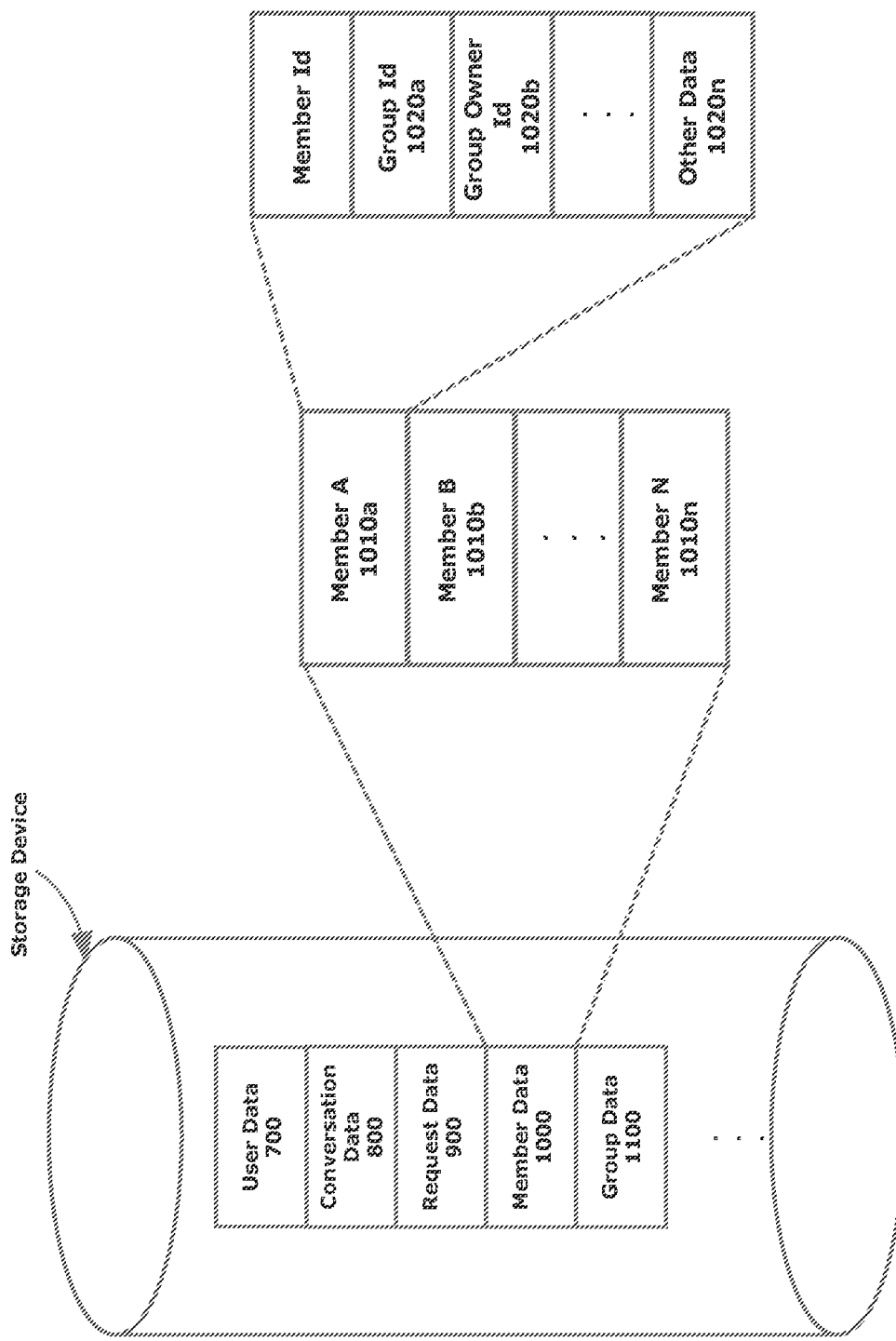
FIG. 10 is a block diagram illustrating an example of how data associated to the request group(s) is stored.

FIG. 10 may illustrate an example of how data regarding request groups is stored. Request Groups (1010*a* through 1010*n*) are groups of users (referred to herein as request group members 1020*a* through 1020*n*) that are given certain permission to view one or more properties of the data of a private request. The requester that creates a private help request has the ability to grant permission to one or more users to view the private request. The permissions can be to view only the short description of the request or may allow the members of the request group to view other properties of the request including the geographical location of the help needed, long description of the help needed, and said permissions may also disclose information regarding the current location of the requester, additional contact information or they may enable a chat conversation by default between the request group member and the requester.

Figure 11:
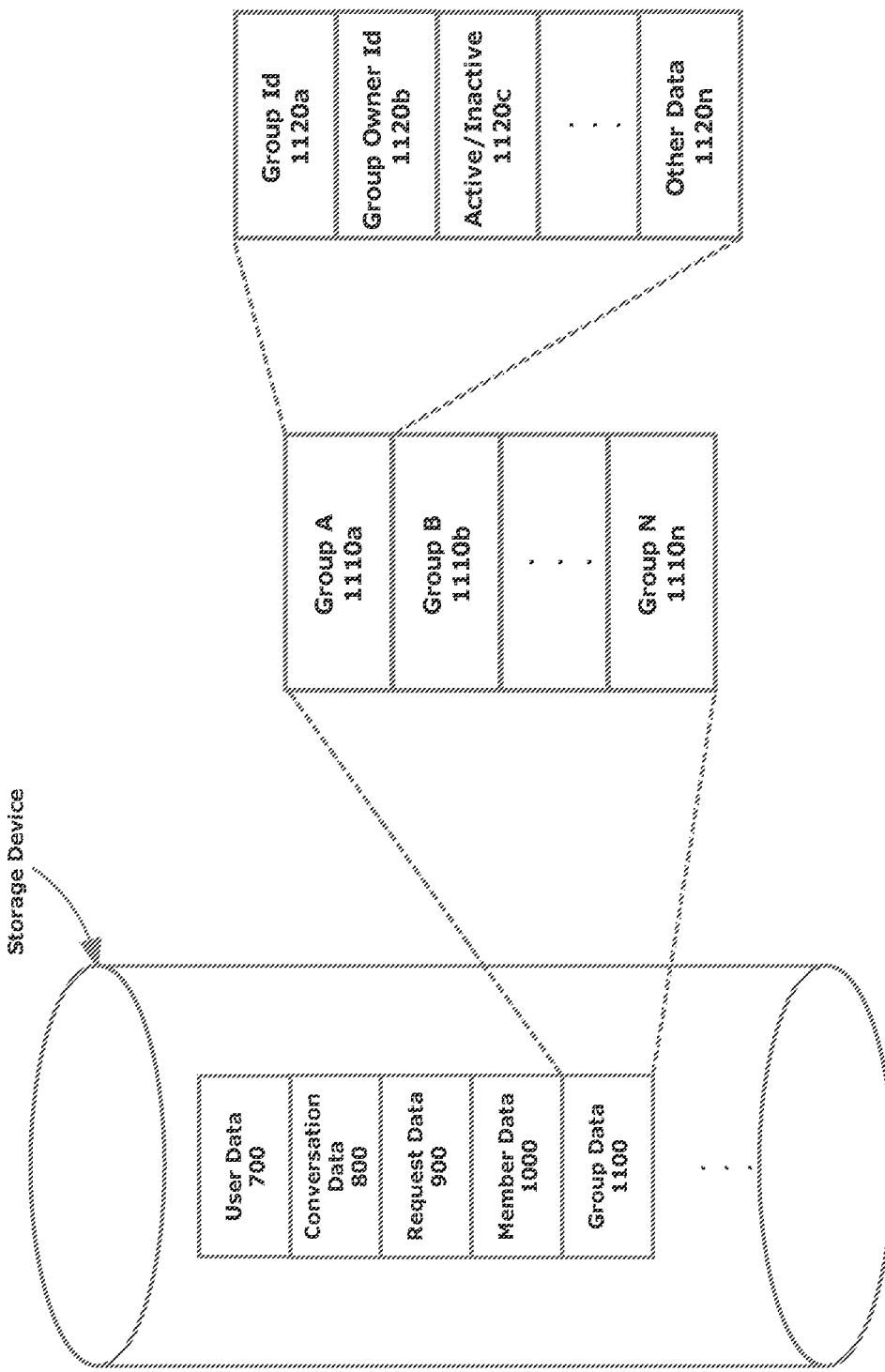
FIG. 11 is a block diagram illustrating an example of how data associated to the watch group(s) is stored.

FIG. 11 may illustrate an example of how data associated to the watch groups is stored. The watch groups will include one or more users that the user associated to the device displaying the user interface has selected to monitor. To create a watch group, a user finds another user and requests said second user to be added to the first user's watch group. The watch group is saved in the Watch Group Data section of the database 1100. Each user may have one or more associated watch groups. The users that will be included in said group are referred to as Watch Members 1120*a* through 1120*n*. The user who creates a watch group or has been authorized by the creator of the group to manage said group has the ability to modify the permissions assigned to the users in the group individually or as a group. Push notifications for requests can also be configured for the watch group or individually.

In at least one embodiment, in order to determine the configuration of the user interface in an access device associated to a user other than the requester when said user selects a single request, the invention uses a rule based on the number of computer implemented communications associated to said request and said user (helper). If the number of computer implemented communications associated to said helper and said request is zero, the helper is given a status equal to zero (status=0, no help has been offered by said user), if the number of computer implemented communications associated to said helper and said request is one, the helper is given the status equal to one (helper status=1, the helper offered help but the requester has not enabled the computing device hosted conversation), if there is more than one computer implemented communications associated to said helper and said request, the helper is assigned a status equal to two (helper status=2 said user offered to help with said request and the requester enabled said computing device hosted conversation).

Figure 12:
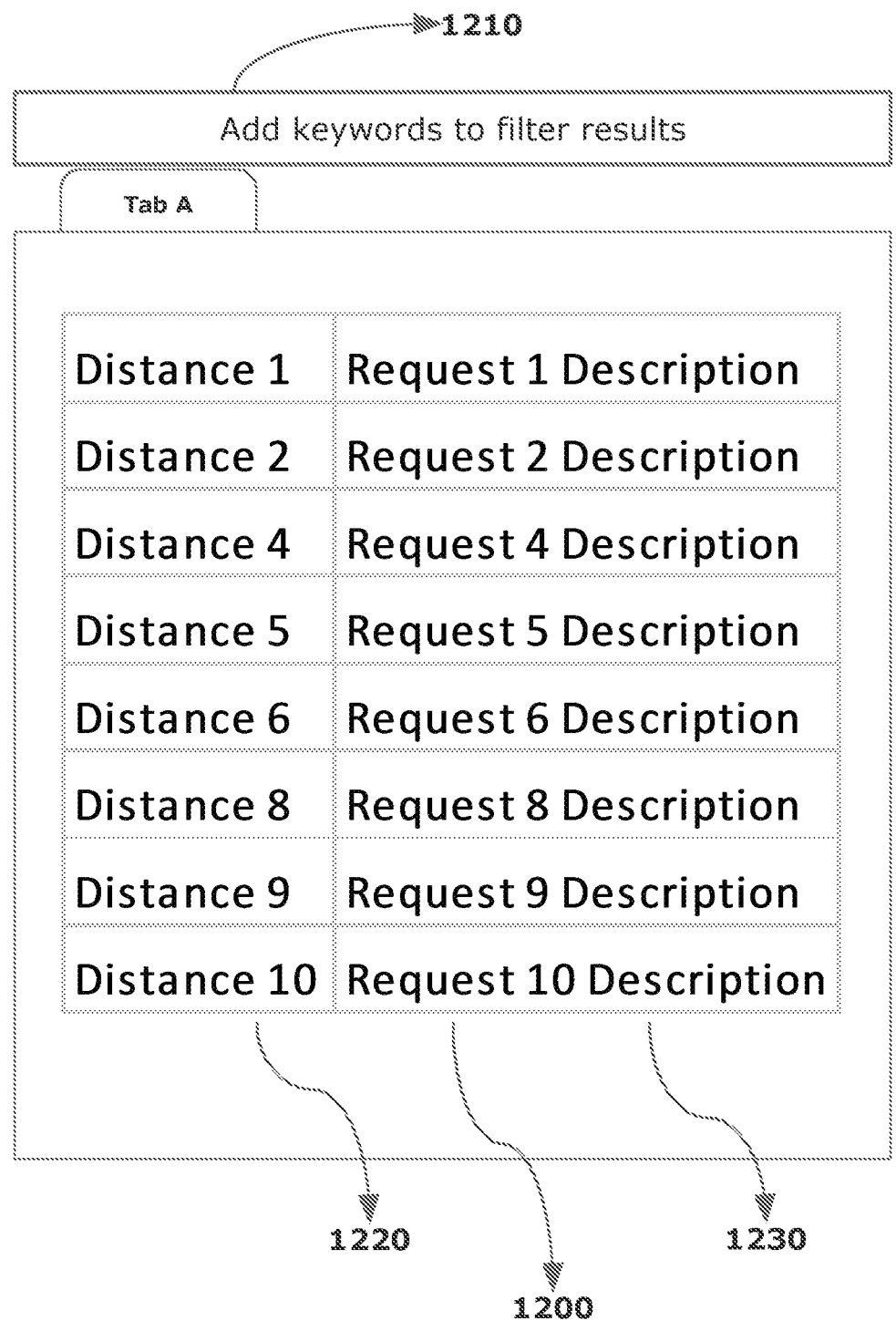
FIG. 12 illustrates an example of the layout of the user interface configuration for tab A.

FIG. 12 may illustrate an example of the layout of the user interface configuration for tab A. Tab A may include a list of help requests 1200 that contains a short description of the help needed 1230 and the calculated distance 1220 between the geographical location data associated to each help request and the geographical location data sent from at least one access device 212 to at least one server system 230, arranged in ascending order. The user interface configuration may also include a section dedicated to collecting one or more keywords 1210 that can be typed in by the user associated to the device displaying tab A in order to filter the results of the help requests that will be displayed in tab A, depending on permission information associated to the requests and the user of said device.

In at least one embodiment, an access device is configured to show a user interface screen, herein referred to as tab B.

Figure 13:
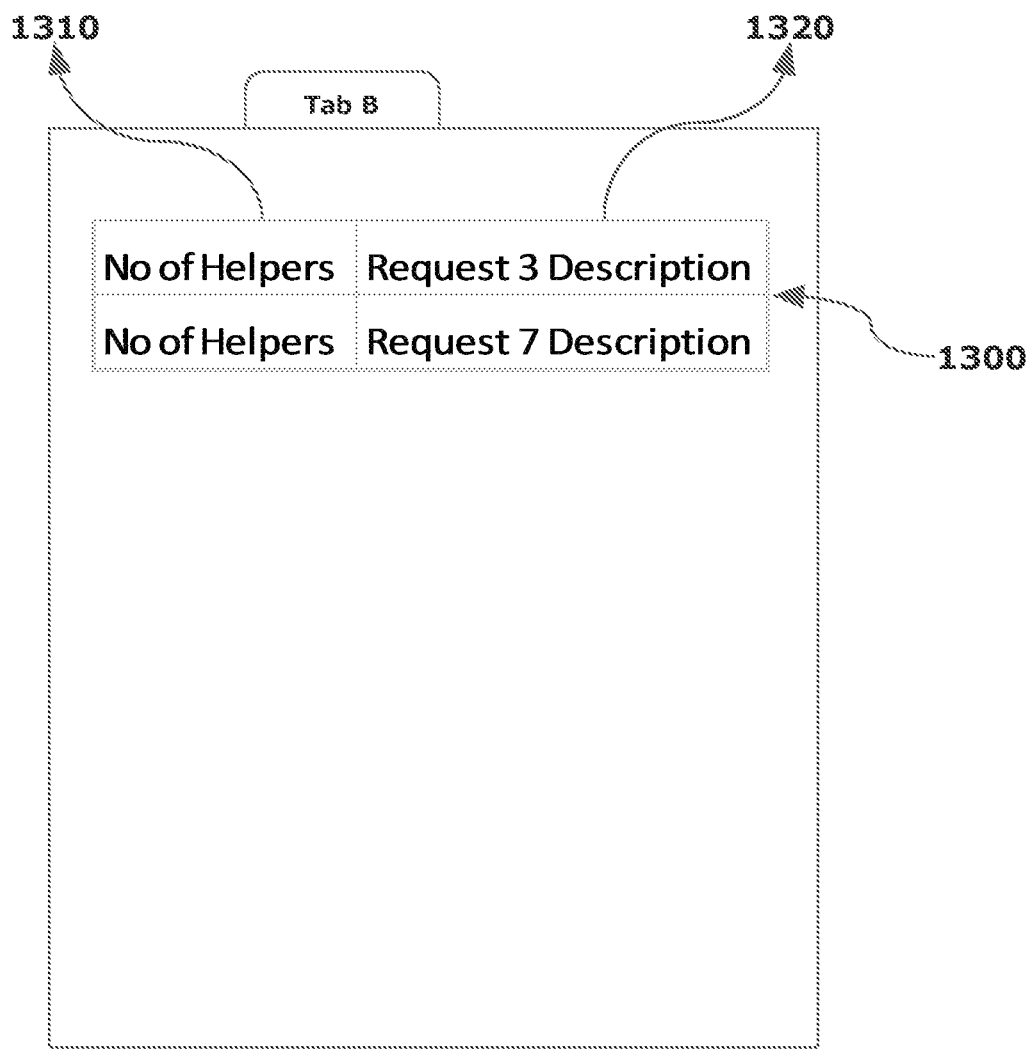
FIG. 13 illustrates an example of the layout of the user interface configuration for tab B.

FIG. 13 may illustrate an example of the layout of the user interface configuration for tab B. Tab B may include a list of help request(s) 1300 that have been created or are being managed by the user associated to said access device where tab B will be displayed. The list of help requests 1300 may include a column that shows the number of helpers that have offered to help per each associated request 1310 and the short description of the help request 1320. Tab B may be populated as a result of the data received from the server system(s) as a response to a query submitted by the access device that includes identification information about the user associated to the access device. Since the help request(s) displayed in tab B have been created and/or managed by the user associated to said access device, the user is referred to as requester and has a level of authorization that allows more visibility of the help request data than the visibility on help requests created or managed by other users. For example, the requester is by default able to access the exact geographical location of the help needed. This is not visible by default to other users unless the requester enables another to have access to this data.

Furthermore, after selecting a particular request from said tab B, the requester may be presented with a different user interface and given permissions that enables certain actions depending on the state of the help request and the number of helpers that have offered help for said help request. Said user interface and permissions are different when the user associated to the access device displaying the user interface is navigating as a helper or prospective helper. Some of the actions available to a requester when the help request is in the Requested status include: edit the help request; close the help request; cancel the help request.

In at least one of the embodiment, some of the actions available to a requester when the help request(s) is in the Help Offered status (number of helpers offered per each request>0) include: view the available helper(s); edit the help request(s); close the help request(s); thank helper(s).

In at least one embodiment, when at least one user has offered help with a help request (help request is in the Help Offered state), the requester may also take additional actions including enable, disable, or send one or more computer implemented communications or any other type of data via a computing device hosted conversation(s).

In at least one embodiment, after choosing to view the available helpers associated to a request, the invention enables the requester associated to said access device to check additional information about said available helpers such as said helpers public profile which includes data that said helpers have previously uploaded to the server system by way of their associated access device(s) via the network(s).

In at least one embodiment, the access device is configured to present a user interface screen, herein referred to as tab C. In this tab, the user associated to the access device takes the role of helper (or prospective helper) and can have different levels of authorization to view and take actions on the help requests, depending on each individual help request.

Figure 14:
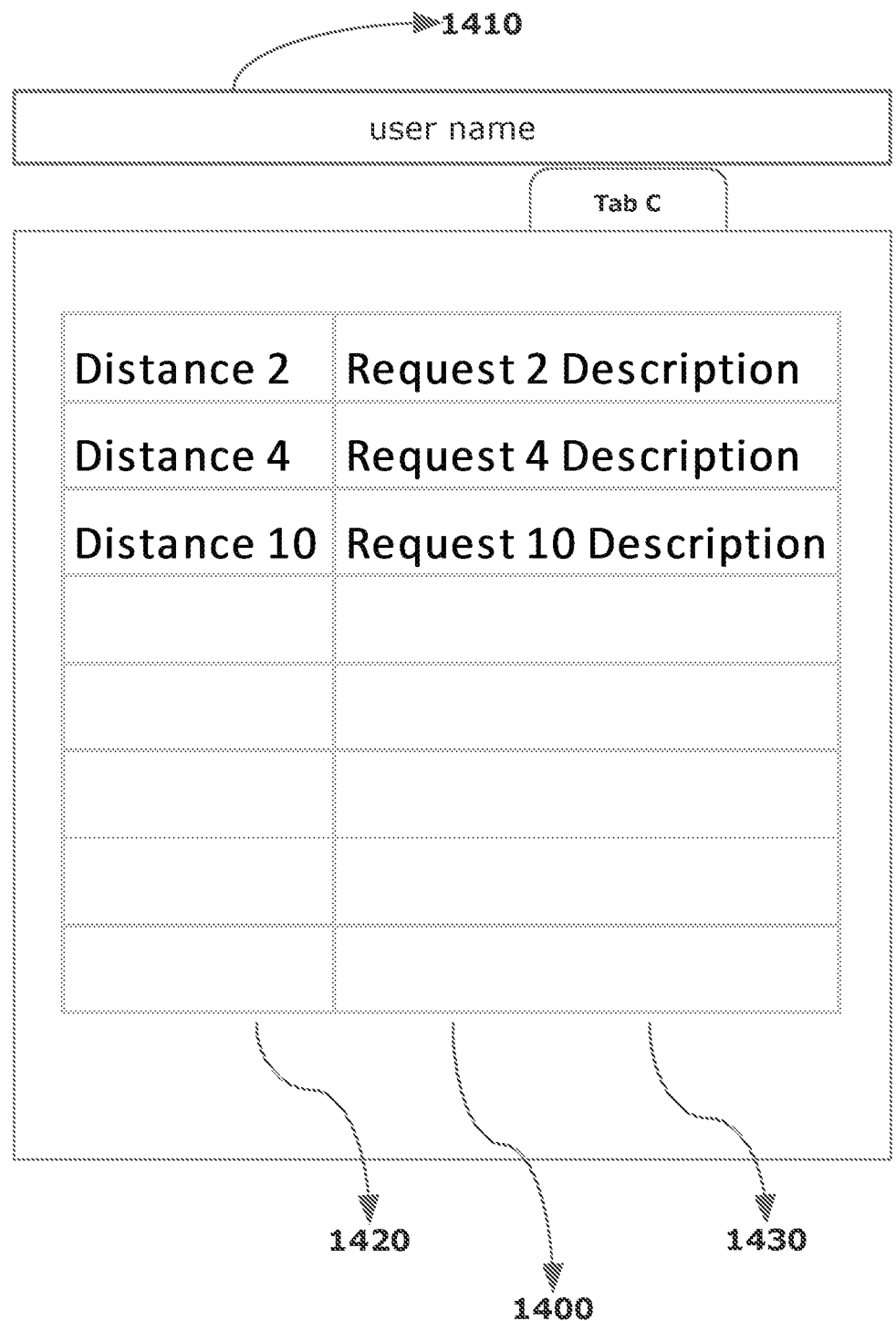
FIG. 14 illustrates an example of the layout of the user interface configuration for tab C.

FIG. 14 may illustrate an example of the layout of the user interface configuration for tab C. Tab C may include requests created and/or managed by a certain group of users referred to as watch group. Tab C may include a list of help requests 1400. The list 1400 may include a column with the short description of the help needed 1430 and a column with the calculated distance 1420 between the geographical location data associated to each help request and the geographical location data sent from at least one access device 212 to at least one server system 230, arranged in ascending order. The user interface configuration may also include a section 1410 dedicated to collecting the user names that the user associated to the device displaying Tab C wishes to add to his/her watch group(s). The names of the users in the watch group(s) are referred to as watch group members.

In at least one embodiment, the access device is configured to present a user interface screen, herein referred to as tab D.

Figure 15:
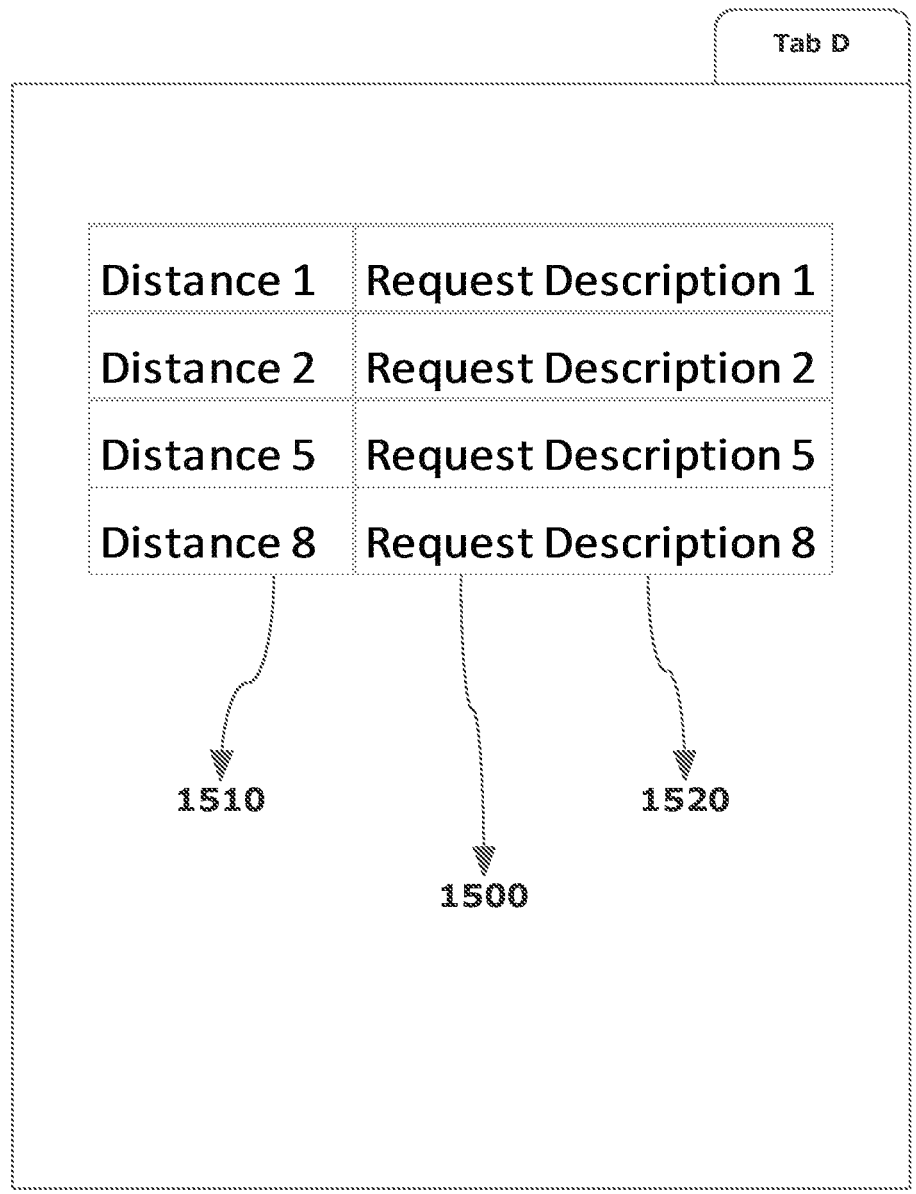
FIG. 15 illustrates an example of the layout of the user interface configuration for tab D

FIG. 15 may illustrate an example of the layout of the user interface configured to show tab D. Tab D may include a list of help requests 1500 where the user associated to said access device displaying said tab D has offered to help. The list 1500 may include a column with the short description of the help needed 1520 and a column with the calculated distance 1510 between the geographical location data associated to each help request and the geographical location data sent from at least one access device 212 to at least one server system 230, arranged in ascending order. In the case of the help requests in said tab D, the user associated to the access device displaying said tab D plays the role of a helper. Therefore, said user is able to view data associated to each help request and take actions according to the permissions granted to said user on each help request.

Once the help has been offered, the access device associated to the helper is configured so that he/she has already offered help and whether the requester has enabled a computing device hosted conversation or not.

In at least one embodiment, and in the cases where the user associated to the access device displaying data associated to one or more help requests is not the requester of said help request(s), the authorization of said user associated to the access device only allows access to view certain data related to the help request. Said data includes a short description of the request 920d and the calculated distance between the geographical location provided by said access device to the server system and the geographical location associated to said request 920*e*.

Furthermore, the possible actions a user can take on each request displayed where said user is not the requester depend on certain rules. For example, said user associated to the access device (not the requester) may offer help with said request. Once said user has offered help on said request, said user may not offer help again for said request. However, said user is not enabled by the invention to send additional computer implemented communications to the requester of said help request until said requester enables the computing device hosted conversation. This allows the requester to have the ability to filter and select which available helpers said requester wants to communicate with beyond their initial offer for help.

Figure 16:
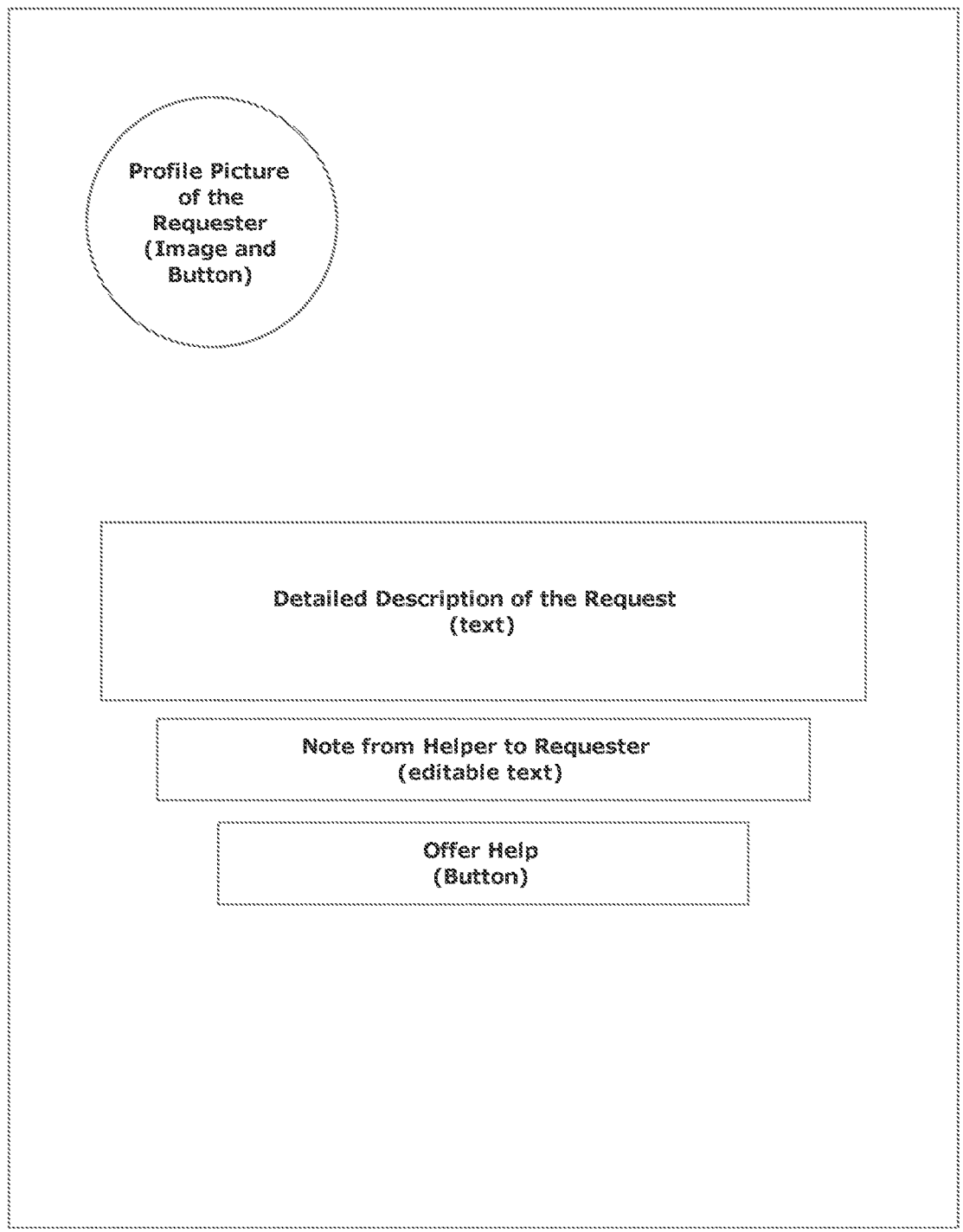
FIG. 16 illustrates an example of the one of the layouts of the user interface configuration in the access device associated to users other than the requesters.

FIG. 16 may illustrate an example of how the access device associated to a helper is configured when the number of computer implemented communications associated to said helper and said request is zero (helper status=0). The user interface is configured to display requester's profile information about the requester and enable said access device to send a computer communication to the requester herein referred to as offer to help.

Figure 17:
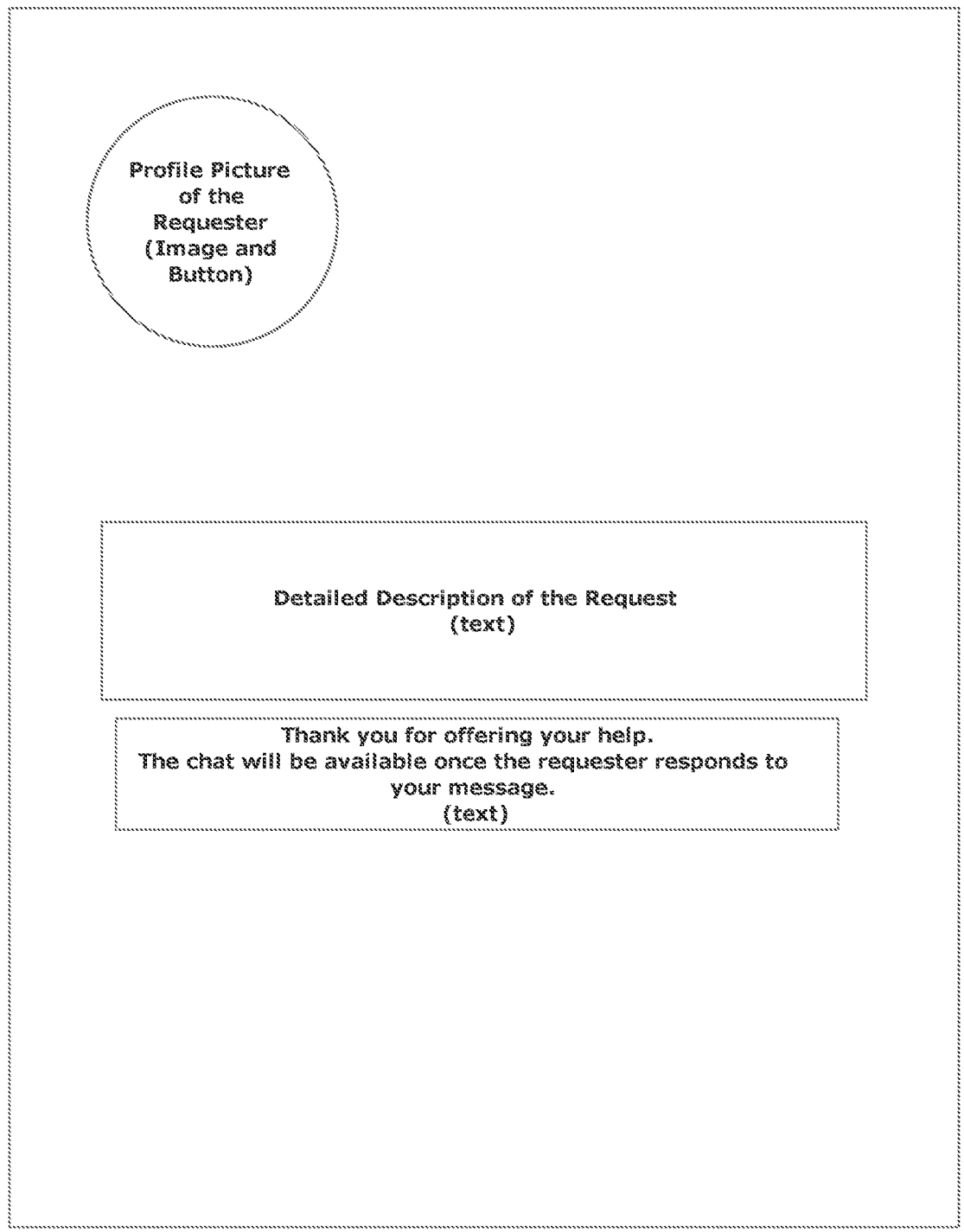
FIG. 17 illustrates an example of the one of the layouts of the user interface configuration in the access device associated to users other than the requesters.

FIG. 17 may illustrate an example of how the access device associated to a helper is configured when the number of computer implemented communications associated to said helper and said request is 1 (helper status=1). The user interface is configured display requester's profile information and a message indicating that help was already offered to said requester.

Figure 18:
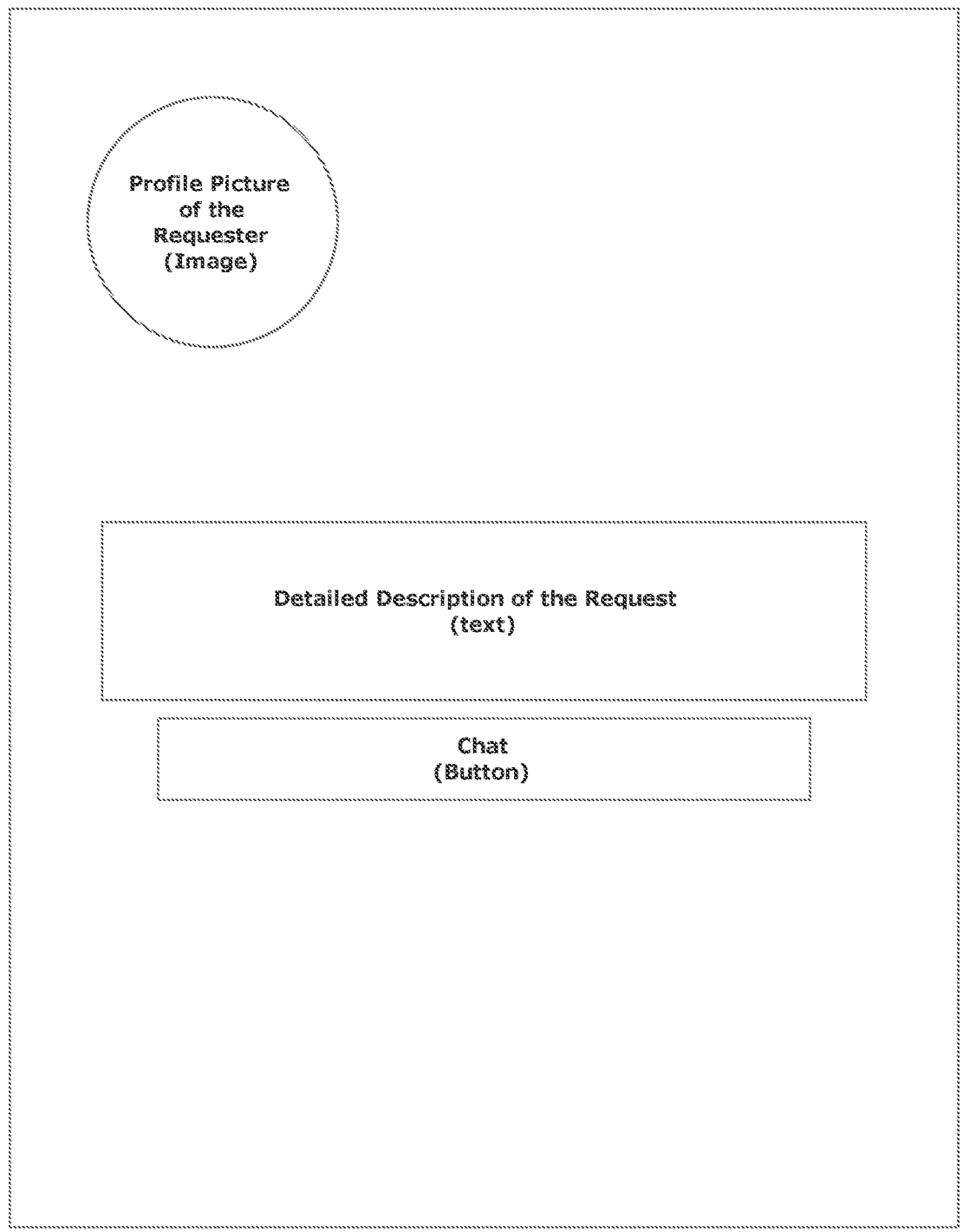
FIG. 18 illustrates an example of the one of the layouts of the user interface configuration in the access device associated to users other than the requesters.

FIG. 18 may illustrate an example of how the access device associated to a helper is configured when the number of computer implemented communications associated to said helper and said request is greater than 1 (helper status=2). The user interface is configured display requester's profile information and enables the user of the access device to access to access the computing device hosted conversation or chat user interface.

Figure 19:
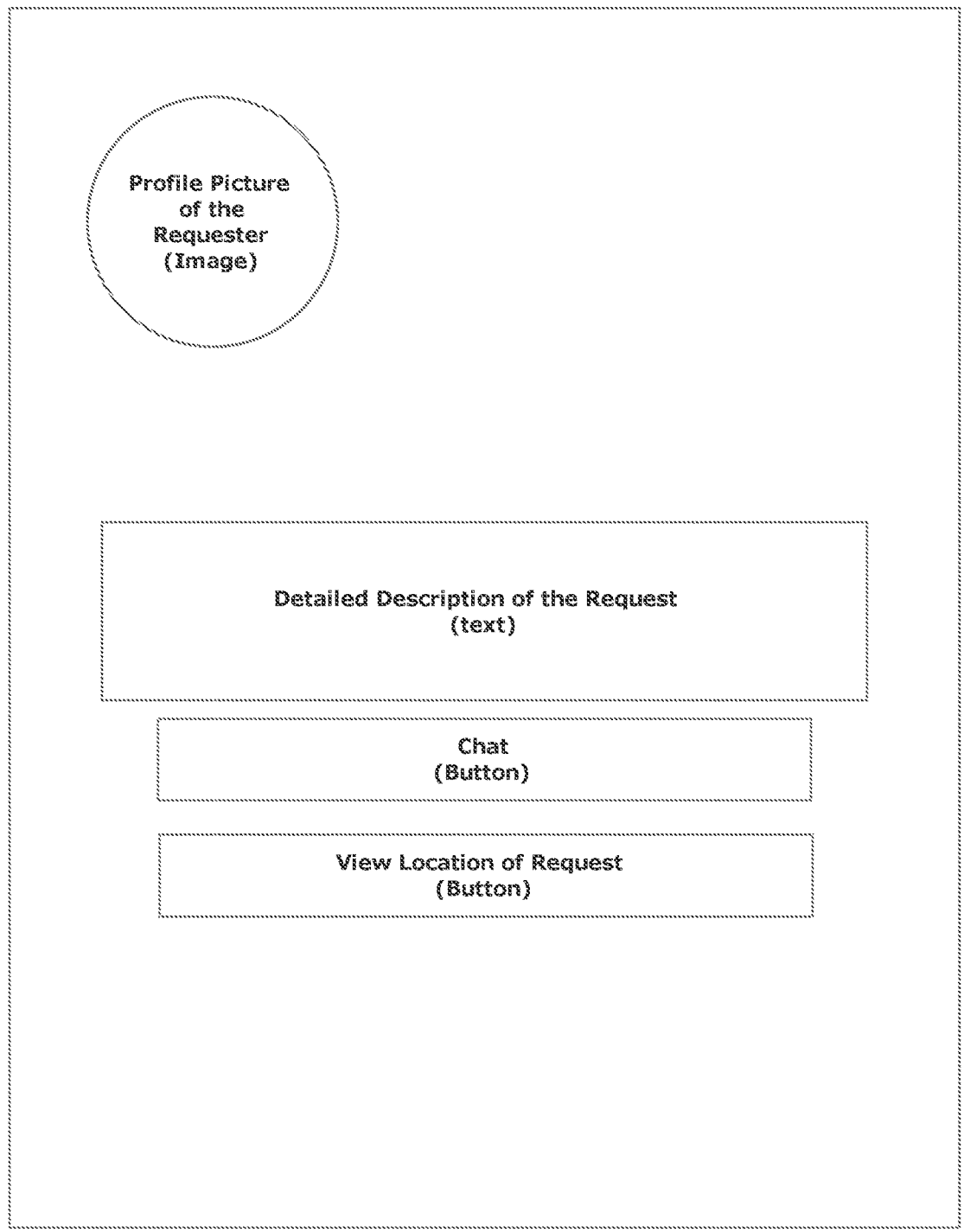
FIG. 19 illustrates an example of the one of the layouts of the user interface configuration in the access device associated to users other than the requesters.

FIG. 19 may illustrate an example of how the access device associated to a helper is configured when the number of computer implemented communications associated to said helper and said request is greater than 1 (helper status=2). The user interface is configured display requester's profile information and enables the user of the access device to access to access the computing device hosted conversation or chat user interface. Additionally, it also displays geographic location of the help requested.

The foregoing description and accompanying figures illustrate the principles, preferred embodiments, and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A computer implemented method for managing one or more help requests, comprising:
receiving, from a requestor via an access device over a communications network, the one or more help requests comprising data related to an identification of the requestor, a baseline permission level, and a geographical location of the access device;
storing, by at least one processor, the one or more help requests data in a database;
identifying, by the at least one processor, one or more access devices associated with at least one helper;
assigning a permission level to the at least one helper, the permission level specified by the requestor;
comparing the permission level of the at least one helper to the baseline permission level of the one or more help requests data;
transmitting, by the at least one processor over the communications network, the one or more help requests data to the one or more identified access devices associated with the at least one helper only if the permission level of the at least one helper meets or exceeds the baseline permission level of the one or more help requests data; and
displaying, via an interface of the one or more identified access devices, the transmitted one or more help requests data.

2. The method of claim 1, further comprising:
receiving, from the one or more access devices associated with the at least one helper, a response to the one or more help requests data, the response indicating whether the at least one helper has offered to help with the one or more help requests data;
storing, by at least the processor, the response data in the database;
transmitting, by the at least one processor, only the response data indicating an offer to help with the one or more help requests data to the requestor access device; and
displaying, via an interface of the requestor access device, the transmitted response data.

3. The method of claim 2, further comprising:
upon receiving transmitted response data, prompting the requestor to enable communication between the requestor access device and that of the at least one helper associated with the transmitted data; and
if enabled, establishing a communication portal between the requestor access device and that of the at least one helper associated with the transmitted data to facilitate a hosted conversation.

4. The method of claim 3, further comprising:
receiving, from the communication portal, communication data related to the hosted conversation;
storing, by the at least one processor, the communication data in the database; and
making available the communication data to the requestor and the at least one helper associated with the transmitted response data.

5. The method of claim 3, further comprising:
providing a means to disable the communication portal.

6. The method of claim 1, wherein the one or more help request data is displayed in accordance with predetermined rules.

7. The method of claim 6, wherein the predetermined rules include listing the one or more help request data by geographical distance between the location data associated with the one or more help requests data and the last known geographical location of the access device displaying the one or more help requests data.

8. The method of claim 1, further comprising:
modifying the permission level of the at least one helper based on authorization of the requestor.

9. A system for the management of one or more help requests, comprising:
- a server including at least one non-transitory computer-readable medium storing executable instructions and a processor adapted to execute the instructions;
- at least one database communicatively coupled to the server for storing data;
- at least one requestor access device in communication with the server via a network; and
- at least one helper access device in communication with the server via the network;
- wherein the server is configured to:
  - receive the one or more help requests from the at least one requestor access device, the one or more help requests comprising data related to an identification of the requestor, a baseline permission level, and a geographical location of the access device;
  - store the one or more help requests data in the at least one database;
  - identify one or more access devices associated with at least one helper;
  - assign a permission level to the at least one helper, the permission level specified by the requestor;
  - compare the permission level of the at least one helper to the baseline permission level of the one or more help requests data; and
  - transmit the one or more help requests data to the one or more identified access devices associated with the at least one helper only if the permission level of the at least one helper meets or exceeds the baseline permission level of the one or more help requests data.

10. The system of claim 9, wherein the server is further configured to:
- receive a response to the one or more help requests data, the response indicating whether the at least one helper has offered to help with the one or more help requests data;
- store response data in the database; and
- transmit only the response data indicating an offer to help with the one or more help requests data to the requestor access device for displaying on an interface of the requestor access device.

11. The system of claim 9, wherein the server is further configured to facilitate communication between the at least one requestor access device and the at least one helper access device.

12. The system of claim 9, wherein the database further comprises at least one of: a request database section, a conversation database section, a request group database section, and a watch group database section.

* * * * *